(12) United States Patent
Stroganov et al.

(10) Patent No.: US 9,470,110 B2
(45) Date of Patent: Oct. 18, 2016

(54) PRESSURIZED-GAS POWERED COMPRESSOR AND SYSTEM COMPRISING SAME

(71) Applicant: NOVOPOWER LTD., Montreal (CA)

(72) Inventors: Valeri Stroganov, Westmount (CA); Philip Raphals, Montreal (CA)

(73) Assignee: NOVOPOWER LTD., Montreal (CA)

( * ) Notice: Subject to any disclaimer, the term of this patent is extended or adjusted under 35 U.S.C. 154(b) by 213 days.

(21) Appl. No.: 14/294,893

(22) Filed: Jun. 3, 2014

(65) Prior Publication Data
US 2014/0373527 A1 Dec. 25, 2014

Related U.S. Application Data

(63) Continuation of application No. 13/202,921, filed as application No. PCT/CA2010/000216 on Feb. 23, 2010, now abandoned.

(60) Provisional application No. 61/154,699, filed on Feb. 23, 2009.

(51) Int. Cl.
*F03G 6/00* (2006.01)
*F01K 7/36* (2006.01)
(Continued)

(52) U.S. Cl.
CPC .................. *F01K 7/36* (2013.01); *F01B 29/12* (2013.01); *F01K 27/005* (2013.01); *F01N 5/02* (2013.01);
(Continued)

(58) Field of Classification Search
CPC .......... F01K 7/36; F01K 27/005; F03G 7/04; F03G 6/003; F04B 35/006; F04B 9/1235; F04B 9/123; F01B 29/12; F01N 5/02; Y02E 10/46

USPC .......... 60/645, 670–681; 417/318, 379, 401, 417/405
See application file for complete search history.

(56) References Cited

U.S. PATENT DOCUMENTS 3,152,442 A   10/1964   Rowekamp
3,489,100 A    1/1970   Hill
(Continued)

FOREIGN PATENT DOCUMENTS

CN   201818460       5/2010
EP    0773346 A1     5/1997

OTHER PUBLICATIONS

Hydro Pac Inc., "Product—High Pressure Hydrogen Compressors", Jun. 2004.

*Primary Examiner* — Hoang Nguyen
(74) *Attorney, Agent, or Firm* — Carmela De Luca; Bereskin & Parr LLP

(57) ABSTRACT

The present invention provides a compressor powered by a pressurized gas, whether steam or another working fluid, and a system for extracting work using such as compressor. The pressurized gas may comprise a heated working fluid in a gaseous state, to displace a piston in an input circuit, which in turn displaces a piston in an output circuit, thereby compressing a compressible fluid or displacing an incompressible fluid. A purpose of the compressor is to convert waste heat, heat generated by the combustion of biomass or other fuels, or heat resulting from the concentration of solar energy into useful power, whether configured to produce compressed air or pump water, which can displace the electricity otherwise used for this purpose, or to produce electricity or motive force directly, through a hydraulic circuit. The system for extracting work does so by an output fluid which is compressed or pumped by a pressurized gas powered compressor.

18 Claims, 19 Drawing Sheets

(51) Int. Cl.
*F01K 27/00* (2006.01)
*F04B 9/123* (2006.01)
*F01B 29/12* (2006.01)
*F01N 5/02* (2006.01)
*F03G 7/04* (2006.01)
*F04B 35/00* (2006.01)

(52) U.S. Cl.
CPC ............... *F03G 6/003* (2013.01); *F03G 7/04* (2013.01); *F04B 9/123* (2013.01); *F04B 9/1235* (2013.01); *F04B 35/006* (2013.01); *Y02E 10/46* (2013.01)

(56) References Cited

U.S. PATENT DOCUMENTS

| | | | |
|---|---|---|---|
| 3,963,383 A | 6/1976 | Hill | |
| 3,976,506 A | 8/1976 | Landau | |
| 3,982,962 A | 9/1976 | Bloomfield | |
| 3,991,574 A * | 11/1976 | Frazier | F01K 27/00 417/318 |
| 4,112,687 A * | 9/1978 | Dixon | E21B 33/0355 165/45 |
| 4,311,010 A | 1/1982 | Wurmfeld | |
| 4,426,847 A | 1/1984 | Fischer | |
| 4,439,114 A | 3/1984 | Kimmell | |
| 4,450,685 A | 5/1984 | Corey | |
| 4,507,918 A | 4/1985 | Holleyman | |
| 4,769,988 A | 9/1988 | Clark, Jr. | |
| 4,864,826 A | 9/1989 | Lagow | |
| 5,375,409 A | 12/1994 | Lamar | |
| 5,551,237 A | 9/1996 | Johnson | |
| 5,947,697 A | 9/1999 | Morrison | |
| 5,953,917 A | 9/1999 | Murphy et al. | |
| 6,694,858 B2 | 2/2004 | Grimes | |
| 7,448,219 B2 | 11/2008 | Bowers et al. | |
| 7,870,735 B2 * | 1/2011 | Romanelli | F01K 25/10 60/653 |
| 8,522,538 B2 * | 9/2013 | Ingersoll | F03D 9/028 417/267 |
| 2003/0121405 A1 | 7/2003 | Grimes | |

\* cited by examiner

PRESSURIZED-GAS POWERED COMPRESSOR AND SYSTEM COMPRISING SAME

FIELD OF THE INVENTION

The present invention pertains in general to the field of pressurized-gas powered equipment, such as steam-powered equipment and more specifically a pressurized gas powered compressor and a system for extracting work using same.

BACKGROUND

Heat engines, such as steam engines, have long been used for converting heat energy into mechanical output. For example, Worthington steam pumping engines, for example as described in "The Worthington Steam Pumping Engine: History of its Invention and Development," by H. R. Worthington, New York, 1887, may utilize a steam-driven piston for pumping water. Other reciprocating engines are also known for producing pumping action of pistons using steam power, for example as described in "Practical Handbook on Direct-Acting Pumping Engine and Steam Pump Construction," by P. R. Bjorling, London and New York, 1889. Such pumps typically pump water via pumping, action of a piston by pushing water out of a cylinder, the piston driven by a steam-driven piston. However, reciprocating steam pumps based on these designs are often heavy, inefficient and costly, and ill adapted for performing forms of work other than the pumping of liquids.

Another type of steam engine is a steam-driven turbine, which may be used for extracting power from superheated steam. However, turbines typically require dry, and generally superheated steam, provided to the turbine under precisely controlled conditions. These constraints limit their usefulness, for example in systems where only wet saturated steam is available, or where the steam supply is irregular.

A number of other steam engines have been developed in recent years, which attempt to efficiently generate rotary motion from wet saturated steam. However, many of these are not well adapted to the production of electricity, given the torque and rotational speeds required of a generator for efficient electricity generation.

The uses of low and medium pressure saturated steam are largely limited to space and water heating. These uses fail to exploit the full potential of such steam for producing useful power. For example, residual heat from industrial processes is typically used for heating purposes, rather than for providing mechanical or electrical power.

Therefore there is a need for a new device and system that can extract desired useful work from pressurized gas such as wet saturated steam.

A number of systems have also been developed in recent years composed of turbines driven by the vapour of a low-boiling point (LBP) working fluid ("Organic Rankine cycle turbines"). These systems are capable of extracting useful work from a heat source of relatively low temperature. However, they are subject to the same constraints as other turbines, and as a result their capital and operating costs are often too high for many applications.

There is thus also a need for a new device and system that can extract useful work from relatively low-temperature heat sources, without the costs and operational constraints associated with Organic Rankine Cycle turbines.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a pressurized gas powered compressor and a system comprising same. In accordance with an aspect of the present invention, there is provided a system for extracting work using a pressurized gas powered compressor, the system comprising: a compressor powered by a pressurized gas, the compressor comprising an output circuit configured to operate compressively on an output fluid supplied thereto; a pressurized gas input system configured to provide the pressurized gas for powering the compressor; an exhaust system configured to convey spent gas from the compressor; and a work extraction system configured to extract work from the compressor at least in part via said output fluid.

In accordance with another aspect of the present invention, there is provided a compressor powered by a pressurized gas, comprising: an input circuit configured to channel the pressurized gas through two or more input piston-cylinder assemblies, wherein each input piston-cylinder assembly is configured to expel spent gas after use; an output circuit including two or more output piston-cylinder assemblies, each output piston-cylinder assembly including an intake valve for entry of fluid and an output valve for exit of compressed fluid; a transfer system configured to transfer force generated in the input piston-cylinder assemblies onto the output piston-cylinder assemblies; a return system configured to facilitate a return stroke of at least a first one of the input piston-cylinder assemblies following a power stroke thereof; a timing system configured to control input and exhaust of the pressurized gas from the input piston-cylinder assemblies; and a distribution system operatively coupled to the timing system, to the pressurized input system, and to the input circuit, the distribution system configured to cooperatively provide pressurized gas to the input piston-cylinder assemblies.

DETAILED DESCRIPTION OF THE INVENTION

Definitions

Figure 1:
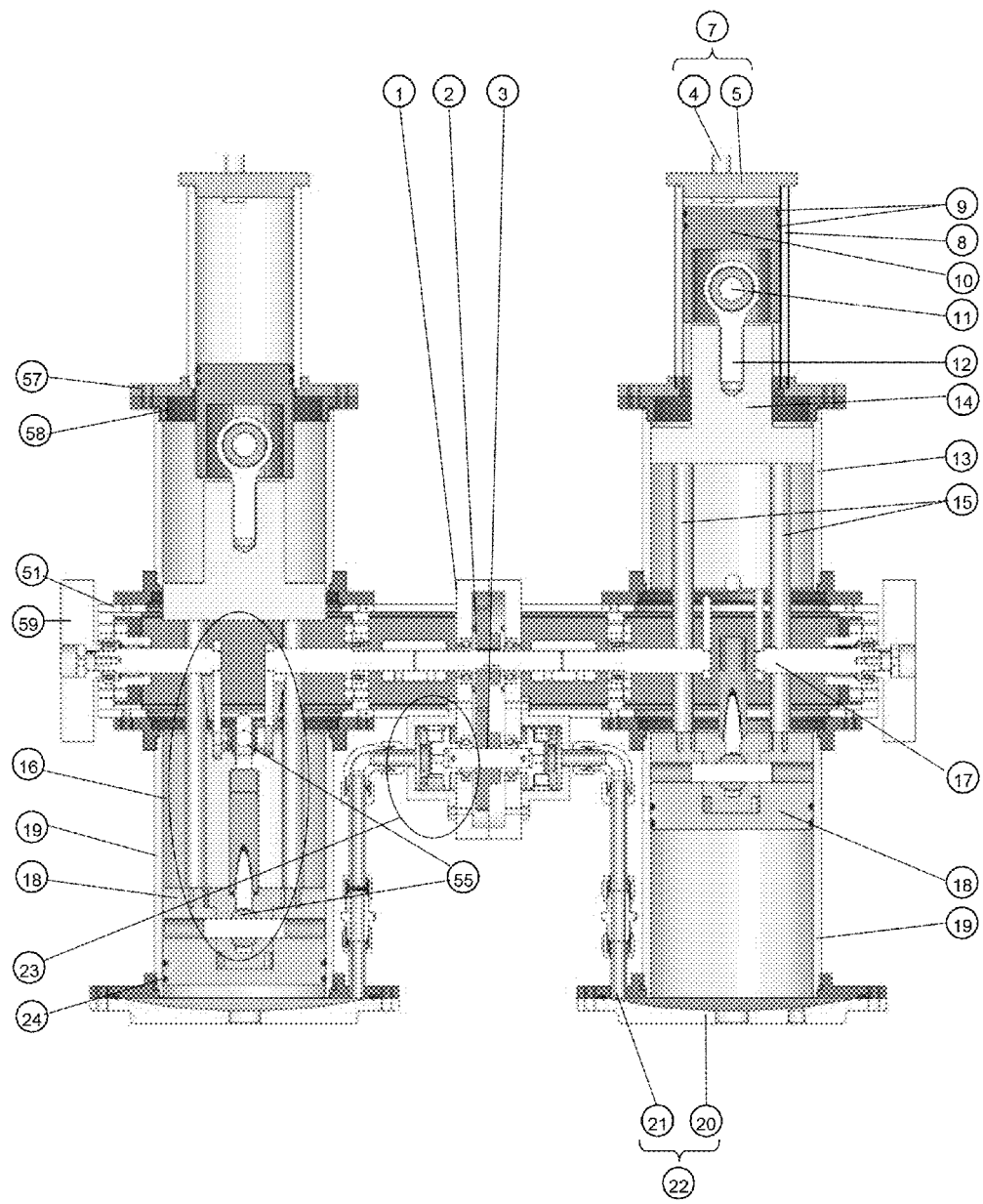
FIG. 1 illustrates a cross-section of a pressurized gas powered compressor according to one embodiment of the present invention.

The term "pressurized gas" is used to define a gas with a pressure greater than atmospheric pressure, which may or may not be later condensed to a liquid state.

The term "spent gas" is used to define a pressurized gas which has lost some or all or its pressure, and which may or may not have partially converted to a liquid state.

The term "condensate" is used to define a portion of spent gas which has converted to a liquid state.

The term "working fluid" is used to define a fluid that, when heated, converts from a liquid to a gaseous state, and which when in a gaseous state may exert pressure upon a piston within a cylinder.

The term "compression" is used to define the application of pressure to a fluid. In the case of a compressible fluid such as air, this pressure results in compression, as commonly understood. In the case of an incompressible fluid, such as hydraulic fluid, it results in the displacement of said fluid within a confined channel, such as a hydraulic circuit.

The term "compressed fluid" is used to define a compressible or incompressible fluid upon which pressure has been exerted by a piston within a cylinder.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Aspects of the present invention provides a device which uses the pressure of a pressurized gas, which may comprise a heated working fluid in a gaseous state, to displace a piston in an input circuit, which in turn displaces a piston in an output circuit, thereby compressing a compressible fluid or displacing an incompressible fluid.

Aspects of the present invention provide a compressor powered by a pressurized gas. The compressor comprises an input circuit configured to channel the pressurized gas through two or more input piston-cylinder assemblies, wherein each input piston-cylinder assembly is configured to expel spent gas after use. The compressor further comprises an output circuit including two or more output piston-cylinder assemblies, each including an intake valve and an output valve allowing the exit of compressed fluid. In some embodiments, a dimension ratio between the input piston-cylinder assemblies and the output piston-cylinder assemblies is selected to provide a desired pressure on a recipient fluid in the output piston-cylinder assemblies. The compressor further comprises a return system configured to return pistons to their starting positions following a power stroke. For example, each input piston may be returned to a starting position by action of the return system. The return system may also be configured to return output pistons to their starting positions. For example, the return system may be configured to return an input piston and an output piston to their corresponding starting positions, wherein the input piston and output piston are coupled together, for example via a transfer system. The compressor further comprises a transfer system configured to transfer force generated in the input piston-cylinder assembling onto the output piston-cylinder assemblies, and a timing system configured to control input and exhaust of the pressurized gas from the input piston-cylinder assemblies. The compressor further comprises a distribution system operatively coupled to the timing system, a pressurized gas reservoir and the input piston-cylinder assemblies, the distribution system configured to cooperatively provide pressurized gas to the input piston-cylinder assemblies.

In some embodiments, the pressure in the output circuit depends at least in part on the pressure of the pressurized gas and the ratio between the square of the diameters of the input and output cylinders, minus frictional losses. The output pressure can be equal to, less than or greater than the pressure of the pressurized gas, depending on the relative diameters of the input and output cylinders.

In some embodiments, the pressurized gas powered compressor is operated in a horizontal position with a slight incline allowing condensate to be expelled from the input cylinders through a steam trap at the end of each return stroke.

According to embodiments of the present invention, an application of a pressurized gas powered compressor is to produce compressed air by the means of steam or another pressurized vapour or gas. This pressurized vapour or gas can consist of residual low-grade steam or can be generated at least in part using heat from a variety of heat sources, including, waste heat, biomass combustion, solar concentrators, etc.

According to embodiments of the invention, an application of a pressurized gas powered compressor is to facilitate conversion of industrial waste heat, for example as conveyed by low-grade steam, into useful power, for example by using the energy contained in steam to build pressure in a compressed air tank. Stored compressed air may be utilized for example for supplying industrial compressed air systems. Moreover, in some embodiments, the extraction of useful work form low grade steam flows can allow the displacement of electrical load from existing compressors, which may increase the plant's energy efficiency and lower energy costs. In some embodiments, exhaust from the pressurized gas powered compressor may be used for heating or other purposes. Low grade steam is generally used for heating purposes, but its prior use in a compressor configured in accordance with embodiments of the present invention, may reduce its heating value only slightly, as the latent heat is typically only released when the steam is condensed to water in a heat exchanger or a condenser.

In accordance with embodiments of the present invention, the pressurized gas powered compressor may be configured for providing a low-cost solution for converting heat to electricity or other useful forms of power, whether through a hydraulic circuit or by other means. Furthermore, embodiments of the compressor of the present invention can have a compact and modular arrangement which can make it adaptable for a variety of applications, and additionally, its simplicity can keep maintenance costs low.

Aspects of the present invention provide a system for extracting work using a pressurized gas powered compressor. The system comprises a pressurized gas powered compressor, the pressurized gas powered compressor comprising an output circuit configured to operate compressively on an output fluid supplied thereto. The system further comprises a pressurized gas input system configured to provide pressurized gas for powering the pressurized gas powered compressor. The system further comprises an exhaust system configured to convey spent gas from the pressurized gas powered compressor. The system further comprises a work extraction system configured to extract work from the pressurized gas powered compressor at least in part via said output fluid.

An embodiment of a pressurized gas-powered compressor in accordance with an aspect of the present invention is illustrated in FIG. 1. The compressor comprises two or more input piston-cylinder assemblies mounted on one side of a frame (51), a similar number of output piston-cylinder assemblies mounted on the other side of the same frame (51), transfer rods (15) connecting each input piston assembly with a corresponding output piston assembly, a return system configured to return each piston to its starting position following its power stroke, a distribution system (23) which connects the input cylinders alternately to a source of pressurized gas and to an exhaust system, for example for venting spent gas to the atmosphere or to a low-pressure reservoir (not shown), or the like, and a timing system configured to facilitate synchronisation of operation of the distribution system and the input piston-cylinder assemblies, for example by timing intake and exhaust of working fluid thereby. Each of these assemblies is described below.

Piston-Cylinder Assemblies

Having particular regard to the embodiment illustrated in FIG. 1, when a pressurized gas is allowed into an interior cavity of an input cylinder (19) by the distribution system (23), it exerts pressure on a corresponding input piston (18) slideably mounted in the input cylinder (19), thereby tending to put the piston into motion. The input piston in turn exerts pressure on the piston base (14), to which it is linked mechanically via transfer rods (15) as described below, which in turn exerts pressure on the output piston (10), to which it is linked mechanically via a rod end (11) and shaft (12), described below. The output piston in turn exerts pressure on a compressible or incompressible fluid contained in the output cylinder (8), creating pressure. The fluid contained in the output cylinder (8) may then be channeled under pressure to perform work, store energy, or the like. For example, the fluid may be channeled through a check valve (4) and thence to a reservoir or work extraction system or other machinery or equipment.

Each input cylinder-piston assembly comprises a hollow input cylinder (19), a cylinder head (22), and a piston (18) slidingly engaging the interior walls of the cylinder (19) and forming a seal therewith. The input cylinder-piston assembly may further comprise one or more scaling rings (24) for each piston. The cylinder head (22) may comprise a rounded cap (20) fixed to the cylinder by mechanical means, such as bolted joints. The cap (20) may include a port (21) allowing connection between the interior of the cylinder and the distribution system as well as a steam trap (not shown) for evacuating condensate.

In some embodiments, the flow of pressurized gas into an input cylinder corresponds to a power stroke for said cylinder, wherein the pressurized gas tends to expand the volume of a cylinder cavity, substantially defined by interior walls of the cylinder (19), the cylinder head (22) and the piston (18), by motion of the piston. The power stroke is typically followed by a return stroke, wherein the volume of the cylinder cavity contracts, by motion of the piston, and the pressurized gas within the cylinder cavity is outlet via an output port.

Figure 2:
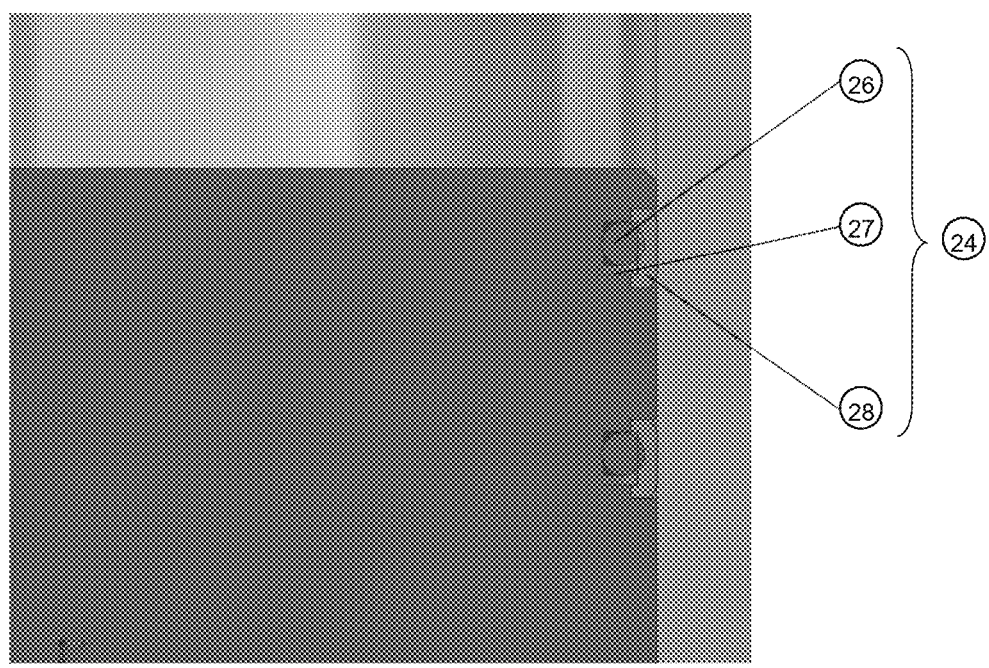
FIG. 2 illustrates an isometric cross-section of a piston of the pressurized gas powered compressor of FIG. 1, in accordance with an embodiment of the present invention.

The sealing ring assemblies (24), which in some embodiments can facilitate operation of the piston-cylinder assembly without application of a lubricating film, are illustrated in more detail in FIG. 2. Each sealing ring assembly (24) may comprise an O-ring (26) set into a deep groove (27) machined into the piston, which applies outward pressure to a cylindrical ring (28) made of a low-friction material such as vitrified PTFE. This cylindrical ring, which in some embodiments is machined on its inner surface to form a groove into which the O-ring fits, sits in a wider and shallower groove machined into the piston.

As further illustrated in FIG. 1, each output cylinder-piston assembly may comprise a cylinder head (7), a cylinder (8), a cylinder flange (57) fixed to a spacer flange (58), a piston (10), a piston base (14), a spacer (13), a rod end (11) on a shaft (12), such as a threaded shaft, and one or more sealing ring assemblies (9) similar to those of the input pistons. In some embodiments, at least one of these scaling ring assemblies (9) may be replaced with a profiled rod/piston seal made of nitrile or other flexible material. The piston base is connected to the input piston by rods (15). The output cylinder head (7) comprises a cap (5) affixed to the cylinder by mechanical means, such as bolted joints. The output cylinder head (7) includes an output port (4) fitted with a check valve, and an air intake port equipped with another check valve (not shown). The input port may be operatively coupled to a source of fluid, such as a hydraulic circuit, air intake, or the like. The output port may be operatively coupled to a reservoir system, storage device, hydraulic circuit, hydraulic or hydro-pneumatic accumulator, hydraulic motor, or the like. Fluid conveyed by the output port may thereby be harnessed to perform useful work, for example.

Figure 3:
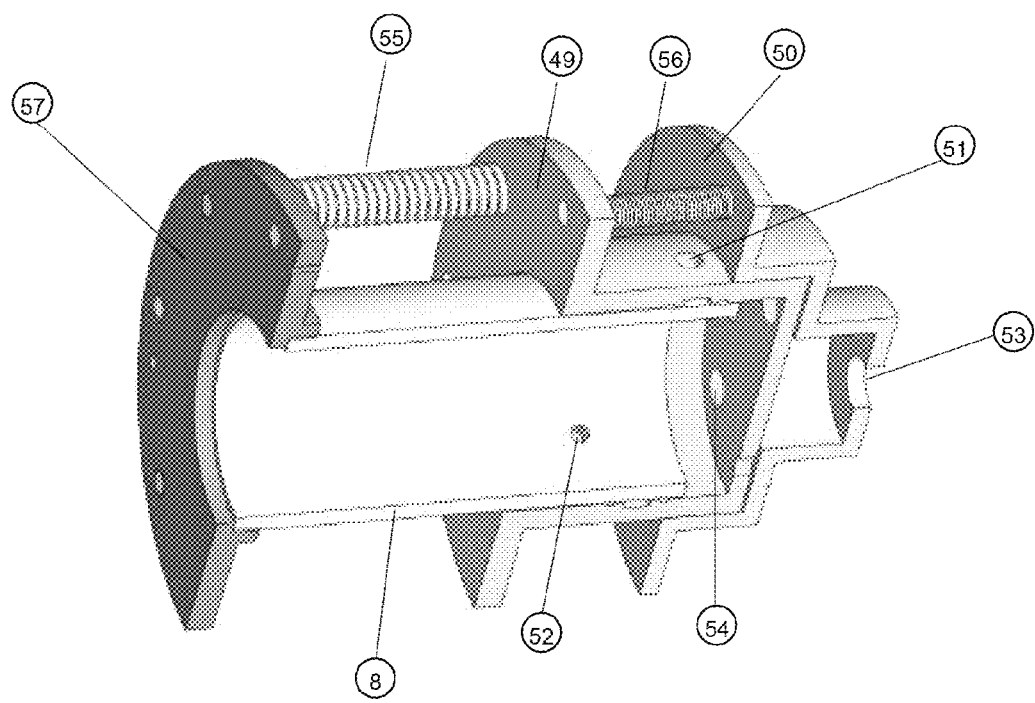
FIG. 3 illustrates a cross-section of an output cylinder fitted with an integrated bidirectional check valve in accordance with an embodiment of the present invention.

In some embodiments, one or more check valves, operatively coupled to an output cylinder, may be replaced with an integrated bidirectional check valve, as illustrated in FIG. 3. The illustrated integrated bidirectional check valve comprises an inner flange (49) and an external flange (50), the inner flange (49) slideably coupled over the output cylinder (8), and the external flange (50) slideably coupled over the inner flange (49). The integrated bidirectional check valve may facilitate substantially unimpeded filling and for emptying of output cylinder (8) by a system of holes or apertures, for example when the output cylinder (8) is surrounded by a fluid, such as ambient air or water. The integrated bidirectional check valve may also facilitate expulsion of pressurized fluid from the output cylinder, with substantial reduction or elimination of "dead space" that results from the use of traditional check valves.

The integrated bidirectional check valve illustrated in FIG. 3 is described as follows. The inner flange (49) is fitted overtop of the output cylinder (8) and slideably engaged therewith. The external flange (50) is fitted overtop of the inner flange (49) and slideably engaged therewith. The inner flange (49) comprises one or more holes (51) in a side thereof, such that the holes (51) are configured to align to similar holes (52) in the output cylinder (8) when the inner flange is slideably moved into a retracted position. When aligned, holes (51) and holes (52) form a channel facilitating communication between the interior portion of the cylinder (8) and the external environment, thereby facilitating filling of the cylinder (8) with fluid during a return stroke, the fluid to be compressed during a subsequent power stroke.

In some embodiments, the inner flange (49) may be slideably supported by rods (not shown) attached to the cylinder flange (57), further supporting at least the inner flange (49) as it slides back and forth overtop the cylinder (8).

In some embodiments, one or more compression springs (55), coupled at a first end to the cylinder flange (57) and at a second end to the inner flange (49), may be configured to bias the inner flange (49) in an extended position, wherein the holes (51) are disaligned with the holes (52), as long as pressure within said cylinder is not less than atmospheric pressure, or more generally, when pressure within the output cylinder is not less than a predetermined amount relative to pressure outside the output cylinder.

When the inner flange is in an extended position, an endwall of the inner flange sits in a spaced-apart configuration with an end of the cylinder (8). When pressure within said cylinder falls below ambient pressure outside the cylinder, the pressure differential results in a force against the inner flange, tending to compress the volume within the cylinder. The force may overcome the biasing force of said compression spring, thereby causing the inner flange to slide into the retracted position, thereby aligning holes (51) and holes (52) to form a channel, facilitating free flow of air or other fluid into output cylinder during a return stroke of the piston (10) within the cylinder (8). In some embodiments, the compression springs (55) are configured to bias the inner flange (49) in the extended position as long as pressure in the ambient fluid is not greater than pressure in the cylinder (8) by a predetermined amount.

In some embodiments, the external flange (50) may be connected by one or more extension springs (56) to the inner flange (49). The external flange (50) comprises a port (53) for facilitating passage of fluid, under compression action of the piston (10) during a power stroke, to a reservoir (not shown) operatively coupled thereto via a channel, such as a hose or pipe. The extension springs (56) are configured to bias the external flange (50) to contact the inner flange (49), in a retracted position, as long as pressure in the cylinder (8) is not greater than pressure in the reservoir and/or channel by a predetermined amount, or, more generally, to bias the outer flange into the retracted position thereof when pressure within a channel configured to receive fluid output from the output cylinder exceeds a predetermined amount relative to pressure within the output cylinder. The end holes (54) of the inner flange (49) are blocked by a portion of the external flange (50) when said external flange is in a retracted position.

For example, the extension springs (56) may be configured to have a biasing force of a predetermined magnitude, which is set against an opposing force due to fluid pressure differential between the output cylinder (8) interior and the reservoir and/or channel connected to the port (53). When pressure within the output cylinder (8) exceeds pressure in the reservoir and/or channel, the difference in pressure causes the spring biasing force to be overcome, thereby causing the external flange (50) to slide forward overtop the inner flange (49) into a spaced-apart configuration, thereby allowing passage of compressed air into a cavity of the external flange through end holes (54) formed in the inner flange. The compressed air then passes through the end holes (54) and port (53) and thence to reservoir and/or channel. On the return stroke of output piston (10), when pressure within output cylinder is less than or equal to pressure in reservoir, the springs (56) connecting the external flange to the inner flange cause said external flange to retract, thereby sealing the end holes (54), and substantially preventing backflow of compressed air from the reservoir to the output cylinder.

In embodiments of the present invention, the bidirectional integrated checkvalve illustrated in FIG. 3 may facilitate the near-total expulsion of the contents of said output cylinder during a power stroke, compared to traditional check valves, resulting in increased efficiency.

In some embodiments, an input check valve, comprising the inner flange (49) slidingly engaged over the cylinder (8) may be provided. In some embodiments, an output check valve, comprising the external flange (50) slidingly engaged over the cylinder may be provided. The input and output check valves may be provided separately of each other in some embodiments.

In some embodiments, the output cylinder-piston assembly comprises a rod end (11) formed with a shaft (12), the shaft operatively coupled to the piston base (14), for example by a threading about the shaft engaged with a corresponding threaded cavity of the piston base (14), and the rod end (11) operatively coupled to the output piston (10). The rod end (11) is fitted within a cavity formed within the piston (10), such that angle between the piston and the shaft (12) can tolerate a predetermined amount of alignment error, for example between the input piston-cylinder assembly and the output piston-cylinder assembly. Rotational motion may comprise at least a few degrees of rotation about one or more axes. The rod end (11) may thereby facilitate reduced friction and/or wear during operation of the compressor.

Figure 19:
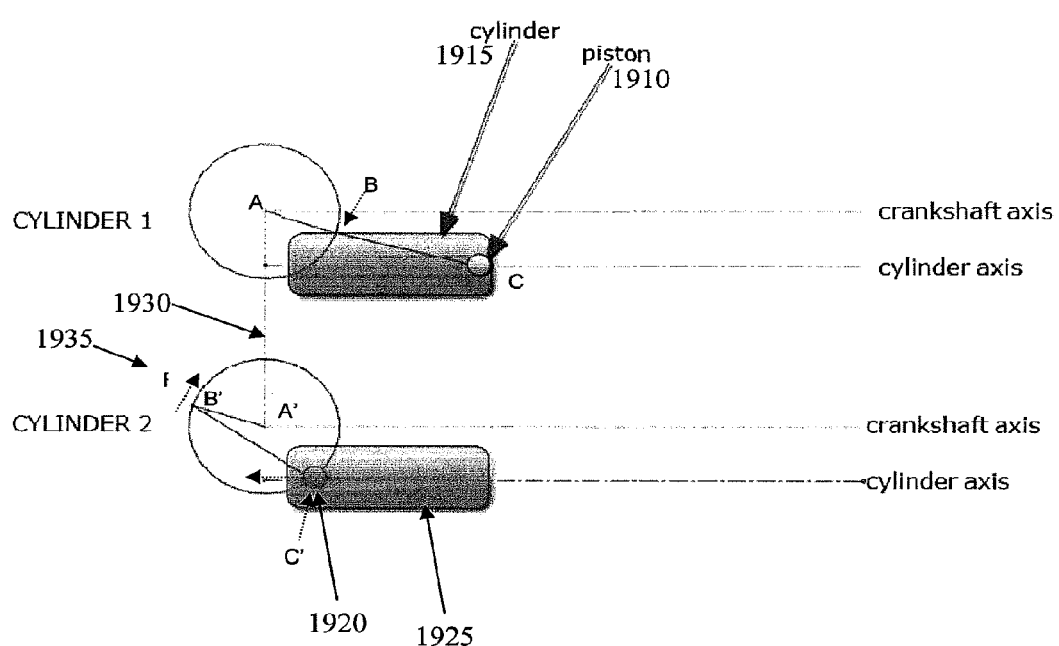
FIG. 19 illustrates a piston-cylinder assembly having its axis offset from the axis of a crankshaft, in accordance with an embodiment of the present invention.

As illustrated in FIG. 1, each output cylinder may lie on an axis of symmetry running through the center thereof. In some embodiments, the axes of the piston-cylinder assemblies are offset from the axis of the crankshaft, such that when one piston reaches the end of its stroke, the other has already passed the end of its stroke and is thus in position to move when pressurized gas is introduced into the cylinder. As illustrated in FIG. 19, in some embodiments, the use of an offset between the axes of the piston-cylinder assemblies and the axis of the crankshaft has the effect that, when piston 1 (1910) of cylinder 1 (1915) is at the end of its power stroke, piston 2 (1920) of cylinder 2 (1925) has not yet reached the end of its power stroke and is thus still able to provide moment F (1935) to the crankshaft (1930), thereby eliminating the "dead point" that could otherwise occur should the machines motion be stopped, due to interruption in the supply of pressurized gas or another reason, precisely when the two pistons are at the end of their respective strokes.

In some embodiments, for example with respect to the compressor as illustrated in FIG. 1, the transfer system, which is configured to transfer force generated in the input piston-cylinder assemblies onto the output pistons, comprises a series of rods (15) rigidly coupled between the input and output pistons, as illustrated in FIG. 1. In other embodiments, the transfer system may also comprise transfer rods, gear systems, drive belts, drive shafts, crankshafts, or the like.

Return System

In embodiments of the present invention, the return of each piston to its original position following its power stroke is carried out at least in part by a crankshaft assembly (16), to which plural piston-cylinder assemblies are attached by rod-ends. For example, as illustrated in FIG. 1, the crankshaft assembly (16) is coupled both to the left input piston and the right input piston. The left input piston may be configured to execute at least a part of its power stroke substantially during the same time that the right input piston executes at least a part of its return stroke, and vice-versa. Force from the power stroke of a piston may be transferred to cause rotation of the crankshaft assembly (16), which may in turn be transferred to apply force to execute or assist in executing the return stroke of another piston.

In some embodiments, the return system may further comprise other elements, such as one or more flywheels (59) operatively coupled to the crankshaft (17), or two or more crankshafts operatively coupled, for example by one or more drive belts or chains, or the like. The return system may additionally use other mechanical means to facilitate the return stroke of one or more pistons.

Timing System

Figure 4:
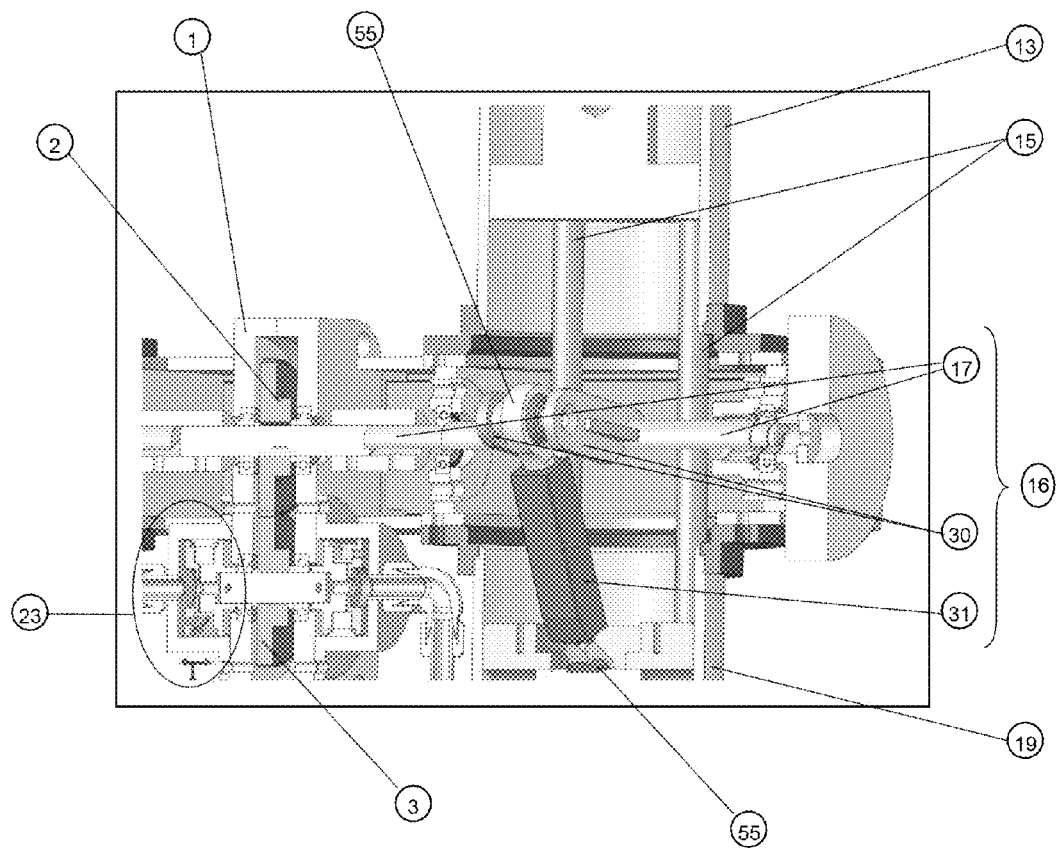
FIG. 4 illustrates an isometric cross-section of a timing system, composed of a crankshaft, gearbox and related elements of the pressurized gas powered compressor of FIG. 1, in accordance with an embodiment of the present invention.

The relative timing of motion of the cylinders and of the distribution system is controlled by a timing system, comprising a crankshaft assembly (16) and a gearbox (1), as illustrated in FIG. 4. Pressurized gas is distributed to each input cylinder and spent gas and/or condensate fluid is evacuated therefrom by a distribution system, for example as illustrated in detail in FIG. 5 in accordance with an embodiment of the present invention. The timing system may be configured to provide feedback about position of the input pistons, which may be used to time operation of the distribution system appropriately, for example by opening a communicating channel between a source of pressurized working fluid and an interior cavity of an input cylinder (19) when an input piston (18) thereof is at or near the beginning of a power stroke, and by opening a communicating channel between an interior cavity of an input cylinder (19) and an exhaust system, reservoir or ambient environment, or the like, when an input piston (18) thereof is at or near the beginning of a return stroke.

In some embodiments, the timing system comprises a crankshaft (17), which is situated within the frame (51), and driven, by cranking motion, by linking rods (30 and 31) connected to the input pistons. One or more flywheels (59), as illustrated in FIG. 1, may be mounted on one or more ends of the crankshaft (29). In some embodiments, said linking rods, connected to the crankshaft (17) and to the input piston (18) by rod ends (55), may be fully contained throughout their range of motion within a cavity of the compressor, for example within a cavity of the input cylinder (19) and the spacer (13). For example, the crankshaft assembly (16) may thereby be configured to move inside the input cylinder (19) and the spacer (13), between the transfer rods (15). This arrangement may facilitate the stroke of the output piston being substantially equal to that of the input piston, even if its diameter is smaller.

In some embodiments, the timing system may comprise one or more sensors, such as position sensors, and/or actuators, such as electrically controlled valves, communicatively coupled by electrical, mechanical or optical signals, or the like. For example, a sensor, such as an electromechanical, optical, or other sensor, may be configured to sense the rotational position of a crankshaft of the compressor, or an element coupled thereto, such as a flywheel. The sensor may further be configured to provide a signal based thereon, and an electrically controlled valve, actuated by said signal, may be configured to operate based on said signal. For example, an electrically controlled valve may be configured to open when a sensor communicatively coupled thereto senses the crankshaft in a first range of rotational positions, and to close when the sensor senses the crankshaft in a second range of rotational positions.

In accordance with the above, the timing system may be actuated directly or indirectly in accordance with rotational position of the crankshaft. The timing system co-operates with the distribution system to facilitate operation of the compressor. The co-operation of timing and distribution system is described further below.

Distribution System

Figure 5:
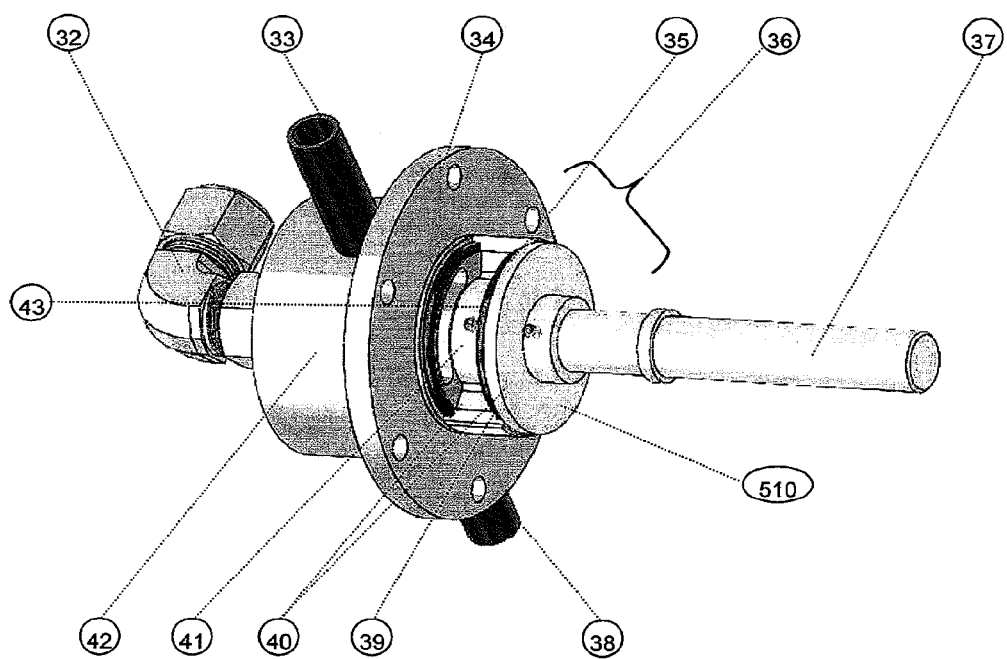
FIG. 5 illustrates a detailed, partially exploded, isometric view of the valve body of the distribution system of the pressurized gas powered compressor of FIG. 1, in accordance with an embodiment of the present invention.
Figure 6:
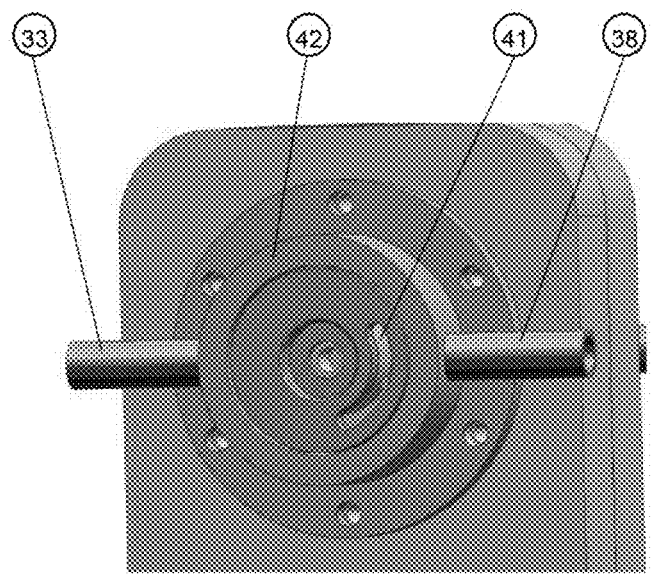
FIG. 6 illustrates a view of the assembled valve body and valve body housing of the distribution system of a pressurized gas powered compressor, in accordance with an embodiment of the present invention.
Figure 7:
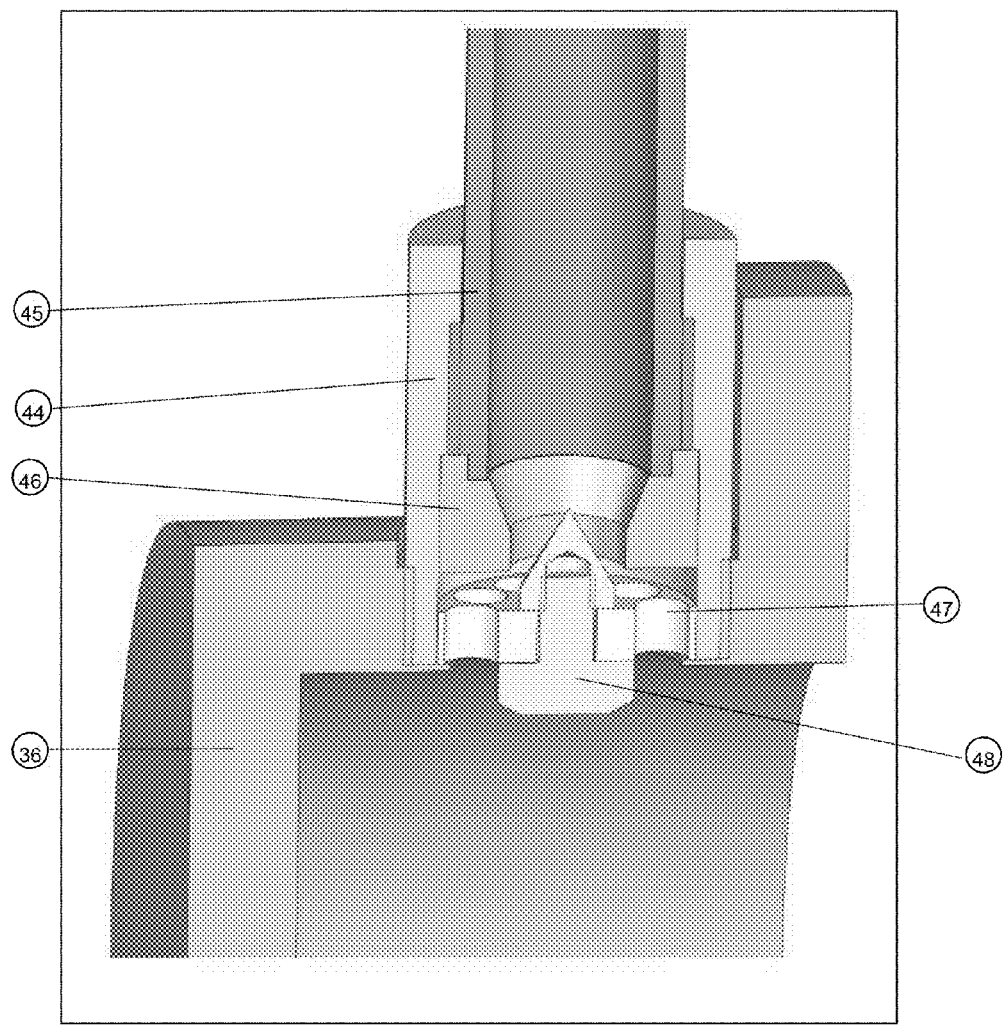
FIG. 7 illustrates a secondary sealing assembly of the valve body housing of the distribution system of a pressurized gas powered compressor, in accordance with an embodiment of the present invention.

The distribution system, for example illustrated in FIGS. 5, 6 and 7 in accordance with embodiments of the present invention, is configured to facilitate circulation of pressurized gas to and from the input cylinders, in conjunction with the timing system. As the pistons traverse their strokes, the crankshaft (17) of the timing system is correspondingly rotated between a plurality of angular positions, by cranking action of the linking rods (30 and 31). A first gear (2), operatively coupled to the crankshaft (17), and a second gear (3), engaged with the first gear (2), are also correspondingly rotated between a plurality of angular positions. The second gear (3) is operatively coupled to a valve assembly (23), which is configured to operate by rotating action to alternatingly establish a first communicating channel between the interior of each input cylinder (19) and a source of pressurized gas, such as vaporized working fluid, and a second communicating channel between the interior of each input cylinder (19) and an exhaust system (not shown) for receiving spent gas. In some embodiments, a separate valve assembly (23) may be provided for each cylinder-piston assembly. Plural valve assemblies may be driven by the same gear or by separate gears.

For example, in some embodiments, the pistons operate substantially out of phase, such that, in a first position, a first piston reaches the end of a power stroke substantially when a second piston reaches the end of a return stroke, and in a second position, the first piston reaches the end of a return stroke substantially when the second piston reaches the end of a power stroke. The first position corresponds to first angular positions of the crankshaft, first and second gears, and the valve assembly. The second position corresponds to second angular positions of the crankshaft, first and second gears, and the valve assembly. In some embodiments, plural pistons may operate in phase, out of phase, or a combination thereof.

In some embodiments, when rotated by the crankshaft and gears into the first angular position, the valve assembly (23) is configured to seal a passage connecting the first cylinder (19) to the source of pressurized gas and to concurrently open a passage connecting it to the low-pressure outlet, through a mechanism described into detail below. In some embodiments, at substantially the same time, the distribution system is configured to seal a passage connecting the second cylinder to the low-pressure outlet and to open a passage connecting the second cylinder to the pressurized gas source, thereby facilitating initiation of a power stroke of the second piston.

The crankshaft (17) is configured to drive one of the two substantially identical gears (2) in the gear box (1); wherein the other gear (3) drives the distribution system, which comprises a rotating valve body (36) and a valve body housing (42), illustrated in FIG. 5 with the valve body (36) retracted from the valve body housing (42). For operation, the valve body (36) is inserted into the valve body housing (42), such that the partial disk (35) is substantially positioned between the high-pressure input port (33) and the low-pressure output port (38).

As illustrated in FIG. 5, the valve body (36) comprises a shaft (37), operatively coupled to and turned by the driven gear (3) of the gear box, a cover (510) connected to the shaft and configured to fit within an opening of the valve body housing (42) so as to substantially cover said opening, a partial disk (35) connected to the shaft (37) and configured to fit within the valve body housing (42), and a disk-shaped valve cover (41) with a partial cut-out on its face. The partial disk is situated with the cover (510) along or near a first face thereof, and the valve cover (41) along or near a second face thereof, opposite the first face. The partial disk (35) does not fill the cylindrical region between the cover (58) and the valve cover (41), but rather defines a gap (43), the gap communicating with the partial cut-out of the valve cover (41) to form a channel. Gas may flow through said channel when the gap (43) in the partial disk is exposed to the high-pressure (input) port (33) or low-pressure (output) port (38) by rotation of the valve body (36) by action of the driven gear (3).

The valve body (36) rotates within the valve body housing (42), with a substantially hermetic seal created by a substantially C-shaped seal (39) formed around the partial disk (35), the seal (39) made of a low-friction material, which is pressed out against the valve body housing by two O-rings (40). The substantially C-shaped seal (39) includes a gap which is substantially aligned with the gap (43). The partial disk (35) and C-shaped seal (39) are configured to alternatingly block and seal, due to rotation thereof in the valve body housing (42), the high-pressure input port (33) and the low-pressure output port (38).

The valve body housing includes an input port (33) coupled to a source of pressurized gas, and an output port (38) coupled to an exhaust system, such as ambient atmosphere, a low-pressure reservoir, a recirculation system, a condenser, or the like. The valve body housing also includes a cylinder port (32) connected by tubing or piping to form a channel to the interior of an input cylinder (19), for example via an input port (21) as illustrated in FIG. 1.

FIG. 6 illustrates the valve body (42) in further detail with input port (33) and output port (38) coupled thereto, along with the valve cover (41) when the valve body is inserted into the valve body housing (42).

When the partial disk (35) and C-shaped seal (39) are rotated to cover an opening of the input port (33), the input port (33) is sealed from the cylinder port (32). In some embodiments, said partial disk and seal may be configured such as to cut off supply of pressurized gas to the input cylinder before the input piston has completed its stroke, thereby allowing the pressurized gas already present within said cylinder to dilate by further displacing the piston. This configuration allows for more efficient operation, in that a greater percentage of the potential energy contained in the pressurized gas is converted to useful work.

In some embodiments, the hermetic nature of this seal may be improved by the addition of a secondary sealing assembly as illustrated in FIG. 7. This secondary seal assembly comprises a threaded hollow housing (44) that forms part of a channel of the input port (33) and that attaches, for example by screwing, into an opening of the valve body (36) at the location of the input port (33), a hollow threaded inner valve shaft (45) with a bonded end (46) that may be attached into the housing (44), for example by screwing, the bonded end (46) contacting the interior wall of the housing (44). The bonded end (46) may in some embodiments be composed of a flexible, heat-resistant material such as silicone. The hollow housing (44) thereby provides a recess that forms part of a channel of the input port, and the bonded end (46) provides an end piece formed within the recess. The secondary seal assembly further comprises a sealing disk (47) configured to fit within an opening of the housing (44), the sealing disk (47) movable along a longitudinal axis of the housing (44) between an open position and a closed position, the open position corresponding to the sealing disk (47) being in a spaced-apart configuration with the bonded end (46), and the closed position corresponding to the sealing disk (47) contacting the bonded end (46).

A guide assembly (48) is attached to the sealing disk (47), which may be configured to constrain motion thereof between the open position and the closed position. The guide assembly (48) may further include a protruding portion which is formed overtop of the sealing disk (47), and which may be conically or frustro-conically shaped, or otherwise be configured with one or more sloped or ramped edges.

The sealing disk (47) includes one or more channels or holes therein to establish a communicating channel between the input port (33) and the cavity of the valve body housing (42), to thereby permit passage of the pressurized gas when the sealing disk (47) is in the open position. A pressure differential between the source of pressurized gas in the input port (33) and the cavity of the valve body housing (42) may bias the sealing disk (47) toward the open position. A spring or other biasing means may also be used to bias the sealing disk (47) into the open position, in addition or alternatively to biasing resulting from the pressure differential.

Continuing with respect to the secondary sealing assembly illustrated in FIG. 7, whenever the partial disk (35) and the C-shaped seal (39) are rotated so as to lie overtop of the input port (33), the C-shaped seal (39) pushes on the protruding portion of the guide assembly (48), thereby forcing it into the closed position, such that the sealing disk (47) contacts against the bonded end (46) of the inner valve shaft (45), thereby covering the holes of the sealing disk (47) and substantially inhibiting flow of the pressurized gas. The sloped or ramped edge shape of the protruding portion facilitates pushing of the sealing disk (47) into the closed position, by allowing the C-shaped seal (39) to gradually displace the protruding portion out of the cavity of the valve body housing.

According to embodiments of the present invention, a similar valve system allows the expulsion of pressurized gas when the input piston (18) is returned to its initial position by the timing assembly.

According to some embodiments of the present invention, a quick-exhaust valve (not shown) is affixed to the input cylinder head (22), in order to allow for a more rapid expulsion of said pressurized gas. Said quick-exhaust valve may be controlled by a solenoid, controlled by an electrical signal produced by a switch triggered mechanically or optically according to the position of the flywheel (59), or by another means. Alternatively, it may be controlled by a hydraulic valve (not shown) triggered by the presence of pressurized gas in the other input cylinder (19).

According to some embodiments of the present invention, a mechanically or electrically controlled input valve affixed directly or by means of a port to the input cylinder head may replace the rotational valve illustrated in FIGS. 5 to 7. Said valve may be controlled by a solenoid, controlled by an electrical signal produced by a switch triggered mechanically or optically according to the position of the flywheel (59), or by another means. Alternatively, it may be controlled by a hydraulic valve (not shown) triggered by the presence of pressurized gas in the other input cylinder (19).

According to embodiments of the present invention, the cylinders, pistons and structural elements are fabricated from steel or from stainless steel, the O-rings from silicone, the cylindrical piston rings (28) from vitrified PTFE, and the C-shaped seal (39) from Vespel or a similar material. Alternate materials for each of the components of would be readily understood by a worker skilled in the art.

In accordance with an embodiment of the present invention, the geometry of the compressor is further configured or aligned to ensure that upon interruption of a supply of pressurized gas, one of the input piston-cylinder assemblies is always in active position, such that there is no "dead point", regardless of the position at the moment of interruption of the supply of pressurized gas.

Figure 18:
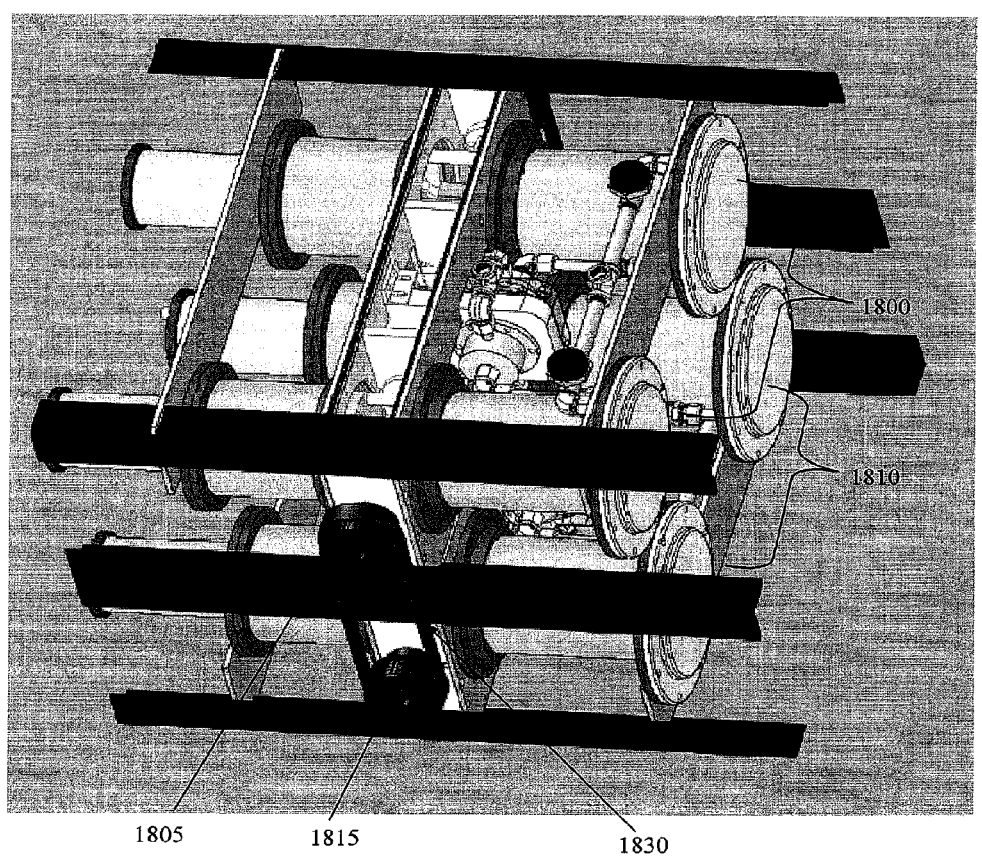
FIG. 18 illustrates a pressurized gas powered compressor having four piston-cylinder assemblies, in accordance with an embodiment of the present invention.

In accordance with an embodiment of the present invention, two or more two-cylinder assemblies, such as the one illustrated in FIG. 1, can be joined together in an assembly comprising four (4) or more input cylinders and a similar or different number of output cylinders. For example, in one such embodiment, as illustrated in FIG. 18, two two-cylinder assemblies (1800 and 1810) such as those illustrated in FIG. 1 could be joined together, with their flywheels (1805 and 1815) connected by a chain or belt (1830). In this embodiment, the timing of one two-cylinder assembly (1800) is set so as to be 90° out of phase from the timing of the other two-cylinder assembly (1810), such that, when the pistons in the first two-cylinder assembly (1800) are at or near the ends of their respective strokes, the pistons of the second two-cylinder assembly (1810) are approximately in the middle of their respective strokes. The result is to smooth out the variations in force applied that otherwise would occur when the pistons reach the ends of their respective strokes, and to reduce potential occurrence of a "dead point" at the end of said strokes. A pressurized-gas powered compressor in accordance with the present invention may thereby comprise a first pair of two or more input piston-cylinder assemblies and a second pair of two or more input piston-cylinder assemblies, and wherein the timing system is configured to operate the first pair of two or more input piston-cylinder assemblies out of phase with the second pair of two or more input piston-cylinder assemblies.

In accordance with other embodiments of the present invention, the number of input and output cylinders may be different from each other. For example, additional input cylinders could be added in order to provide additional torque to the crankshaft, whether to provide motive force directly via said crankshaft, or to provide additional compressive force to the output pistons.

System

In accordance with an aspect of the present invention, there is provided a system for extracting work using a pressurized gas powered compressor. The system generally comprises a pressurized gas input system, a pressurized gas powered compressor, powered by the pressurized gas input system, an exhaust system operatively coupled to the pressurized gas powered compressor and configured to convey spent gas and/or condensate therefrom, and a work extraction system operatively coupled to the pressurized gas powered compressor and configured to extract work therefrom.

Figure 8:
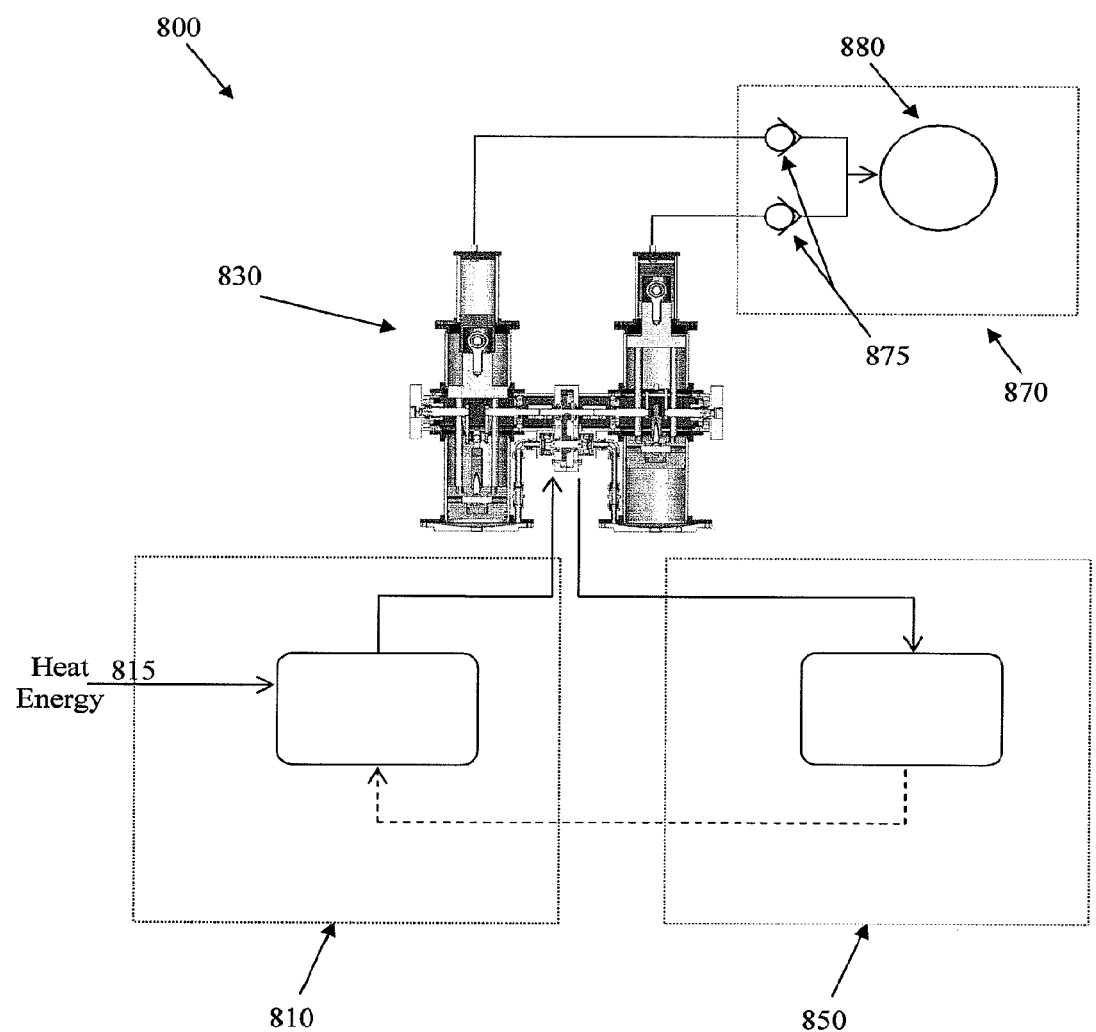
FIG. 8 illustrates a system for extracting work from pressurized gas, using a pressurized gas powered compressor, in accordance with embodiments of the present invention.

FIG. 8 illustrates a system (800) for extracting work using a pressurized gas powered compressor, in accordance with embodiments of the present invention. The system comprises a pressurized gas input system (810) configured as a source of pressurized gas, such as saturated steam or vapour generated from a low boiling point (LBP) working fluid, a pressurized gas powered compressor (830) powered by the pressurized gas from the pressurized gas input system (810), an exhaust system (850) for conveying spent gas and/or condensate from the pressurized gas powered compressor (830) after use, and a work extraction system (870), powered by the pressurized gas powered compressor (830) and configured to store or convey energy in one or more forms.

The pressurized gas input system (810) may be configured to generate pressurized gas using heat energy (815) from one or more sources, such as solar, fuel combustion, heat from an industrial process, or the like. In some embodiments, the work extraction system (870) comprises one or more check valves (875) and one or more devices (880) such as accumulators, reservoirs, motors, generators, or the like.

The pressurized gas input system is configured to utilize heat from a heat source to create pressurized gas from a working fluid or working fluid condensate, such as water or liquid LBP working fluid. In some embodiments, a heat exchanger is used to transfer heat from the heat source to the working fluid. Potential LBP working fluids may include n-pentane, toluene, and ammonia, for example, or other fluids, or mixtures thereof, or aqueous or non-aqueous solutions thereof. The pressurized gas is created in a boiler, vapour generator, or similar apparatus, and conveyed under pressure to an input of the pressurized gas powered compressor.

According to embodiments of the present invention, the heat source may comprise a solar concentrator, a biomass combustion apparatus, a source of heat such as waste heat from one or more industrial processes, or a combination thereof, or the like.

According to embodiments of the present invention, the compressor is configured to be driven by steam or other pressurized gas generated by one or more devices or mechanisms that concentrate heat from solar radiation and/or that produce heat from the combustion of biomass or other fuels, in order to produce electricity from renewable sources.

Figure 9A:
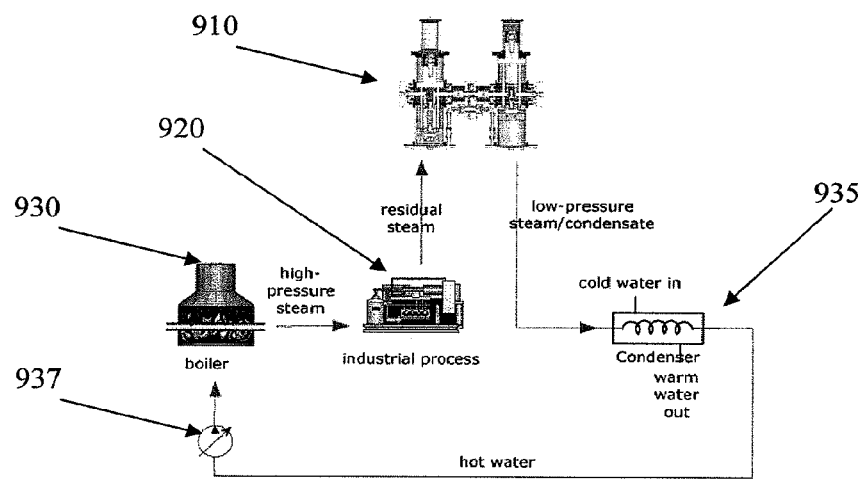
FIG. 9A illustrates a configuration for driving a pressurized gas powered compressor using residual steam, in accordance with an embodiment of the present invention.

For example, FIG. 9A illustrates a configuration for driving a pressurized gas powered compressor (910) using residual steam, in accordance with an embodiment of the present invention. The residual steam is provided as partially spent gas output by an industrial process (920), which utilizes high-pressure steam from a boiler (930).

Figure 9B:
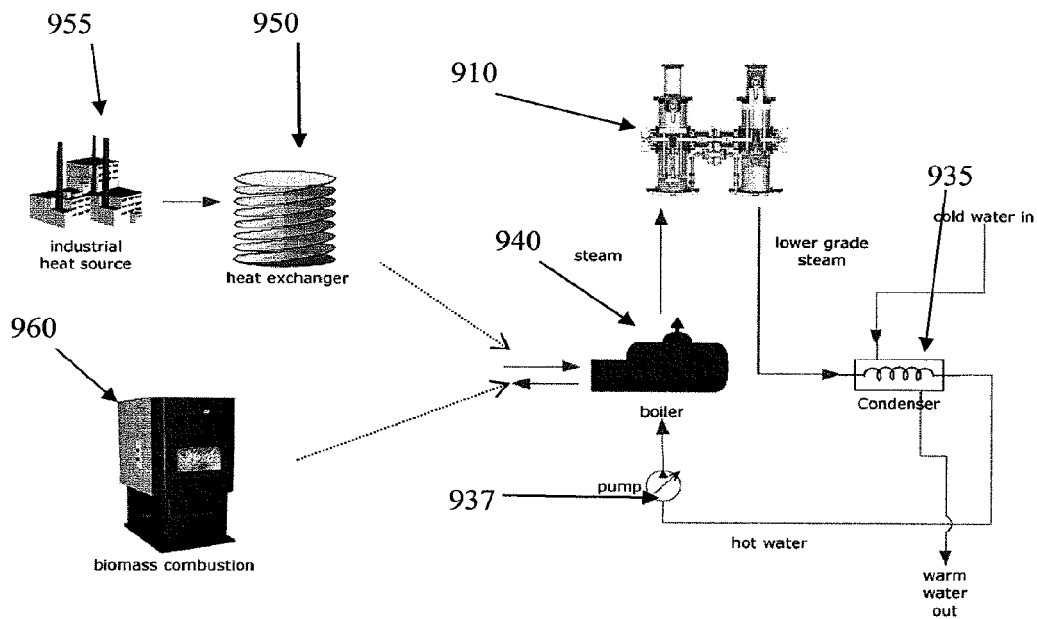
FIG. 9B illustrates a configuration for driving a pressurized gas powered compressor using steam generated using one or more heat sources, in accordance with an embodiment of the present invention.

As another example, FIG. 9B illustrates a configuration for driving a pressurized gas powered compressor (910) using steam generated in a boiler (940) using a heat source, in accordance with an embodiment of the present invention. The steam may be wet saturated steam. The heat source may a heat exchanger (950) configured to convey heat from an industrial heat source (955), a biomass combustion device (960), a solar concentrator, or other heat source, or a combination thereof. FIGS. 9A and 9B further illustrates a condenser (935) for condensing exhausted steam, and a pump (937) for facilitating recirculation of hot exhaust water back to the boiler (930).

According to some embodiments of the present invention, the gas input system may be configured to provide pressurized gas to a plurality of apparatuses, including the pressurized gas powered compressor, for example in series or in parallel. For example, in some embodiments the pressurized gas input system is configured to provide pressurized gas to the pressurized gas powered compressor after said pressurized gas is used for one or more other processes. For example, the one or more processes may be industrial processes, machinery operating processes, heating or cooling processes, or the like. The pressurized gas output from the one or more other processes, which may be considered spent gas in the context of said processes, may nonetheless still contain sufficient energy for operation of the pressurized gas powered compressor. In some embodiments of the present invention, a pressurized gas powered compressor may be advantageously operated using wet or partially spent or other working fluid.

According to some embodiments, the exhaust system is configured to recirculate working fluid, for example spent gas and/or condensate, to the gas input system. The exhaust system may cool the working fluid to facilitate flow of the spent gas from the gas powered compressor. In some embodiments, the exhaust system may utilize the working fluid for further processes, such as heating, cooling, adsorption chilling, absorption chilling, or the like. In some embodiments, the exhaust system does not recirculate working fluid, but may instead expel the working fluid, such as spent gas, steam, condensate, water, or the like, from the system. The gas input system and exhaust system may be collectively configured to generate a gradient, such as a pressure and/or thermal gradient, between an input and an output of the pressurized gas powered compressor, which biases working fluid to flow through the pressurized gas powered compressor from the gas input system to the exhaust system.

In some embodiments, working fluid for converting to pressurized gas, for example in a boiler or vapour generator, may be provided from an external source of fresh or makeup fluid, as recirculated fluid from the exhaust system (850), or a combination thereof. For example, condensed working fluid from the exhaust system (850) may be provided to a boiler or vapour generator for re-conversion into gas, since it is already substantially preheated, and makeup fluid may be provided from an external source to compensate for working fluid losses as the working fluid circulates. In some embodiments, the makeup fluid may be preheated, for example via a heat exchanger which is configured to transfer heat from the exhaust system (850), for example from a condenser thereof, to the makeup fluid.

The pressurized gas powered compressor generally comprises an input circuit operatively coupled to the pressurized gas input system and the exhaust system, and an output circuit operatively coupled to the work extraction system. The pressurized gas is configured to flow through the input circuit and to perform work thereon, for example by moving pistons of the input circuit. The pressurized gas powered compressor further comprises a transfer system configured to transfer work from the input circuit to the output circuit, for example by transferring force from moving pistons of the input circuit to move pistons of the output circuit, for example using transfer rods, gear systems, drive belts, drive shafts, crankshafts, or the like. The pressurized gas powered compressor further comprises additional elements, such as a timing system, distribution system, and/or valve gear system, configured to control and/or facilitate the flow of pressurized gas and exhaust through the input circuit.

According to embodiments of the present invention, a system for extracting work using a pressurized gas powered compressor may comprise a pressurized gas powered compressor substantially as described in detail herein, for example with respect to FIG. 1. According to embodiments of the present invention, a system for extracting work using a pressurized gas powered compressor may comprise other configurations of pressurized gas powered compressors, which, in some embodiments, may be referred to as reciprocating pumps, steam pumps, pumping engines, or the like.

For example, in some embodiments, a system for extracting work using a pressurized gas powered compressor may generally comprise a pressurized gas powered compressor comprising an output circuit configured to operate compressively on an output fluid supplied thereto, which is utilized for performing work, transferring force, storing energy, or the like, in a work extraction system, the pressurized gas powered compressor powered by gas from a pressurized gas input system.

For example, the pressurized gas powered compressor comprises one, two or more input piston-cylinder assemblies and one, two or more output piston-cylinder assemblies operatively coupled to each of the input piston-cylinder assemblies. In some embodiments, the compressor may have a simplex configuration, with an output piston-cylinder assembly operatively coupled to an input piston-cylinder assembly at one end thereof. In some embodiments, the compressor may have a duplex configuration, with output piston-cylinder assemblies operatively coupled to an input piston-cylinder assembly at both ends thereof.

In some embodiments, an input piston-cylinder assembly may be single-acting, with compressed gas applied in the cylinder to operate the piston during the power stroke only. In some embodiments, an input piston-cylinder assembly may be double-acting, with compressed gas applied in the cylinder to operate the piston during both the power stroke and the return stroke, for example by applying compressed gas alternatingly to either side of the piston, as would be readily understood by a worker skilled in the art.

In some embodiments, an output piston-cylinder assembly may be single-acting, with fluid pumped thereby during the power stroke only. In some embodiments, an output piston-cylinder assembly may be double-acting, with fluid compressed and/or pumped thereby during both the power stroke and the return stroke, for example by pumping fluid alternatingly from cavities on either side of the output piston, as would be readily understood by a worker skilled in the art.

In some embodiments, two or more single-acting input piston-cylinder assemblies may be operated in phase, such that the two or more pistons execute power strokes and return strokes substantially concurrently, out of phase, such that one of the two or more pistons executes a power stroke as another executes a return stroke, or a combination thereof.

In some embodiments, two or more input piston-cylinder assemblies may be arranged in a cascading configuration, such that pressurized gas partially exhausted by a first input piston-cylinder assembly is provide as input gas to a second input piston-cylinder assembly. In some embodiments, two or more input piston-cylinder assemblies may be arranged in a parallel configuration, such that pressurized gas is supplied from the same source thereto.

The work extraction system is generally configured to transform work performed by the output circuit into work applied to one or more applications, such as electricity generation, water or fluid pumping, air compression, mechanical force applied to an apparatus, or the like. The work extraction system is configured to convey work performed by the output circuit via one or more fluids, such as liquids or gases, wherein one of the one or more fluids is moved by compression action of the output circuit, for example via cylinders thereof.

In some embodiments, the work extraction system and/or output circuit comprises one or more valves, such as check valves. The valves may be configured to inhibit backflow of a fluid conveyed by the work extraction system, thereby facilitating extraction of useful work.

In some embodiments, the work extraction system comprises an energy storage device such as a hydraulic or hydro-pneumatic accumulator or pressurized tank. The energy storage device may be configured to store energy accumulated from work extracted by the work extraction system, for example by holding a non-compressible fluid under pressure, the pressure applied via the extracted work. An accumulator or other energy storage device may operate as a buffer, so that the extracted work need not be used immediately, but rather may be stored for future use.

In some embodiments, the work extraction system comprises a hydraulic or pneumatic motor operated by a fluid conveyed under pressure by the work extraction system. The hydraulic or pneumatic motor may be operated to perform mechanical work, such as moving objects, operating machinery, or the like.

In some embodiments, the work extraction system may be configured to pump water. For example, pumped water may be drawn into an input port of the output circuit and expelled, by compression action out of an output port of the output circuit and into an output channel. Pumping of water may be performed to raise the water to a predetermined height and into a storage reservoir. In some embodiments, the storage reservoir may be used to store energy as gravitational potential energy. For example, the water may be stored at a height from which it may be subsequently released to drive a hydraulic turbine or used for other purposes. In some embodiments, the water may be driven by gravity to drive an electric generator, as would be readily understood by a worker skilled in the art.

In some embodiments, the work extraction system may be configured to generate electricity. For example, a fluid conveyed, for example under pressure, by the work extraction system may be used to operate an electric generator by applying force to a turbine operatively coupled thereto, a hydraulic or pneumatic motor operatively coupled thereto, or a combination thereof. In some embodiments, additional control mechanisms may be implemented in order to follow loads and/or to control the quality of the electricity produced.

In some embodiments, the work extraction system comprises a compressed air storage reservoir, and the output circuit is configured to produce pressurized air that is stored in said storage reservoir. The pressurized air may be released in varying amounts in order to turn a motor or turbine which in turn drives a generator, so as to produce electricity as needed. In some embodiments, this may obviate the need for an electrical energy storage device. In some embodiments, the pressurized air may be used for other applications, such as for operating pneumatic tools, or the like.

Figure 10A:
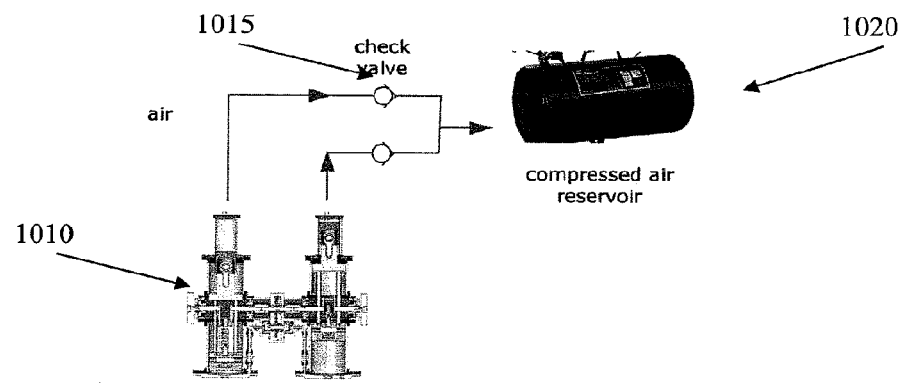
FIG. 10A illustrates a configuration for producing compressed air using a pressurized gas powered compressor, in accordance with an embodiment of the present invention.

For example, FIG. 10A illustrates a configuration for producing compressed air using a pressurized gas powered compressor (1010), in accordance with an embodiment of the present invention. Air is pumped by the compressor (1010) via check valves (1015) to a compressed air reservoir (1020).

Figure 10B:
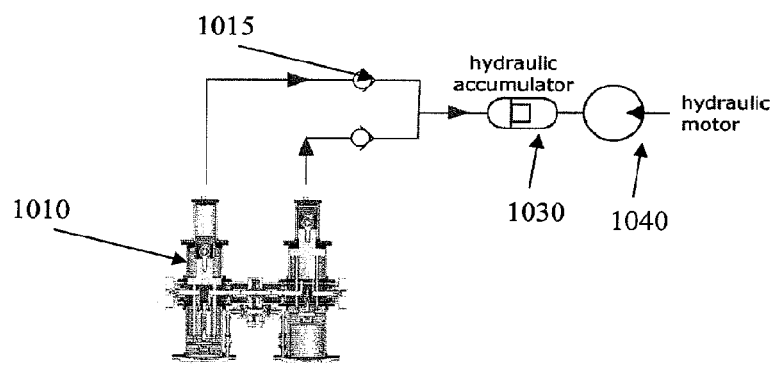
FIG. 10B illustrates a configuration for producing motive force using a pressurized gas powered compressor, in accordance with an embodiment of the present invention.

As another example, FIG. 10B illustrates a configuration for producing motive force using a pressurized gas powered compressor (1010), in accordance with an embodiment of the present invention. Pressure of a hydraulic fluid, such as water or oil, is built in a hydraulic accumulator (1030) by pumping action of the compressor (1010) via check valves (1015). In some embodiments, the hydraulic accumulator (1030) may operate as a buffer, for example so that the extracted work need not be used immediately, but rather may be stored for future use. Such a buffer may be used to facilitate coping with fluctuations or mismatches between energy supply and energy demand. For example, the compressor (1010) may pump hydraulic fluid into the hydraulic accumulator (1030), or the compressor (1010) may pump air to fill an expandable bladder in the hydraulic accumulator (1030), or the like. Pressurized hydraulic fluid in the hydraulic accumulator (1030) may be used to operate a hydraulic motor (1040) for producing motive force.

Figure 10C:
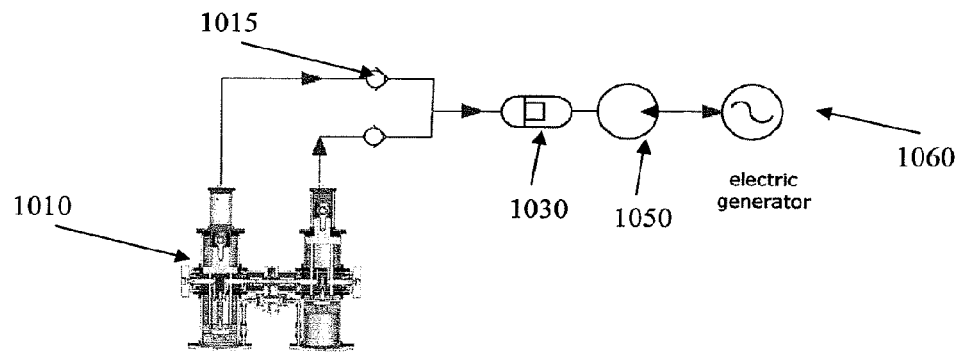
FIG. 10C illustrates a configuration for producing electricity using a pressurized gas powered compressor, in accordance with an embodiment of the present invention.

As yet another example, FIG. 10C illustrates a configuration for producing electricity using a pressurized gas powered compressor (1010), in accordance with an embodiment of the present invention. Pressure of a hydraulic fluid, such as water or oil, is built in a hydraulic accumulator (1030), which may operate as an energy buffer, by pumping action of the compressor (1010) via check valves (1015). Pressurized hydraulic fluid in the hydraulic accumulator (1030) may be used to operate a hydraulic motor (1050), which is operatively coupled to an electric generator (1060). Force applied to the electric generator (1060) results in generated electricity, which may be transmitted or stored for future use. In some embodiments, the hydraulic motor (1050) and electric generator (1060) may be integrated as a hydraulic generator machine.

According to embodiments of the present invention, the pressurized gas input system is configured to supply the input circuit of the pressurized gas powered compressor with low or medium pressure saturated steam, and the output circuit of the pressurized gas powered compressor is supplied with ambient air, which operates as a fluid conveyed by the work extraction system. In these embodiments, the system can be configured to deliver compressed air to an industrial compressed air system, thereby replacing the electricity which would typically otherwise have been used by the air compressors.

According to embodiments of the present invention, the input circuit is supplied with low or medium pressure saturated steam, and the output circuit is joined to a hydraulic circuit. In these embodiments, the pressurized gas powered compressor may be configured to deliver a flow of pressurized hydraulic fluid, which can be configured to drive a hydraulic motor, which may in turn drive an electric generator.

According to embodiments of the present invention, the input circuit is supplied with low or medium pressure saturated steam, and the output circuit is supplied with water or another fluid. In these embodiments, the compressor delivers a flow of said liquid which can be used either for projecting it against a wheel, turbine or turbine-generator to create rotational force, for displacing said liquid (pumping), or for displacing it to a higher elevation in order to store potential energy for subsequent release through a wheel, turbine or turbine-generator.

The invention will now be described with reference to specific examples. It will be understood that the following examples are intended to describe embodiments of the invention and are not intended to limit the invention in any way.

EXAMPLES

Figure 11:
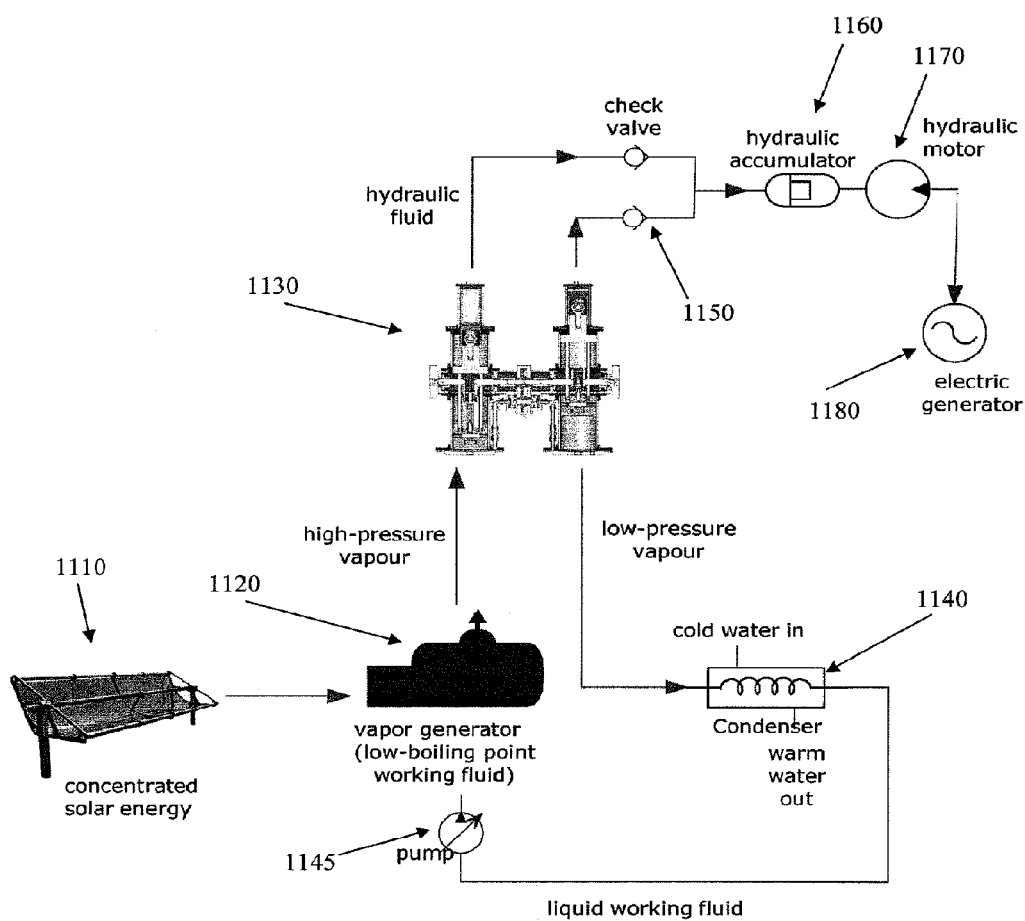
FIG. 11 illustrates a system for producing electricity from solar energy using a pressurized gas powered compressor, in accordance with an embodiment of the present invention.

FIG. 11 illustrates a system for extracting electricity from solar energy using a pressurized gas powered compressor (1130), in accordance with an embodiment of the present invention. The system comprises a solar concentrator (1110) configured to convey heat energy from the sun to a vapour generator (1120). The vapour generator (1120) utilizes the heat energy for boiling a LBP working fluid into a pressurized vapour. The pressurized vapour is provided as input to an input circuit of the pressurized gas powered compressor (1130) and performs work thereon. The spent vapour is exhausted from the pressurized gas powered compressor (1130) to an exhaust system and condensed in condenser (1140), before being recirculated back to the vapour generator (1120) for reboiling. Recirculation of liquid working fluid from the condenser (1140) may comprise pumping using a pump (1145).

The gas powered compressor (1130) conveys power from its input circuit to an output circuit thereof, which is configured to compressively perform work on a hydraulic fluid, such as oil or water, for example by pumping it. The output circuit of the gas powered compressor (1130) is operatively coupled to a work extraction system which comprises check valves (1150), a hydraulic accumulator (1160), a hydraulic motor (1170), and an electric generator (1180). Fluid is pumped under pressure from the output circuit through the check valves (1150) and into the hydraulic accumulator (1160), which may store hydraulic fluid under pressure, gravitational potential energy, or a combination thereof, or the like. The hydraulic fluid may subsequently be channeled to drive one or more hydraulic motors (1170), such as a rotary motor configured to convert hydraulic pressure and flow into mechanical torque and angular displacement of the motor. For example, the hydraulic motor (1170) may be a gear and vane motor, axial plunger motor, radial piston motor, or the like. In some embodiments, the hydraulic motor may be configured to drive an electric generator to generate electricity directly clue to rotational motion thereof. In some embodiments, an electric generator (1180) may be operatively coupled to the hydraulic motor (1170), for example via gear systems, drive shafts, drive belts, or a combination thereof, or the like, the electric generator configured to generate electricity from mechanical motion thereof. The electricity may be stored, used for one or more applications, transferred to a power transmission or power distribution system, or the like, or a combination thereof. In some embodiments, additional control mechanisms may be implemented in order to follow loads and/or to control the quality of the electricity produced.

Figure 12:
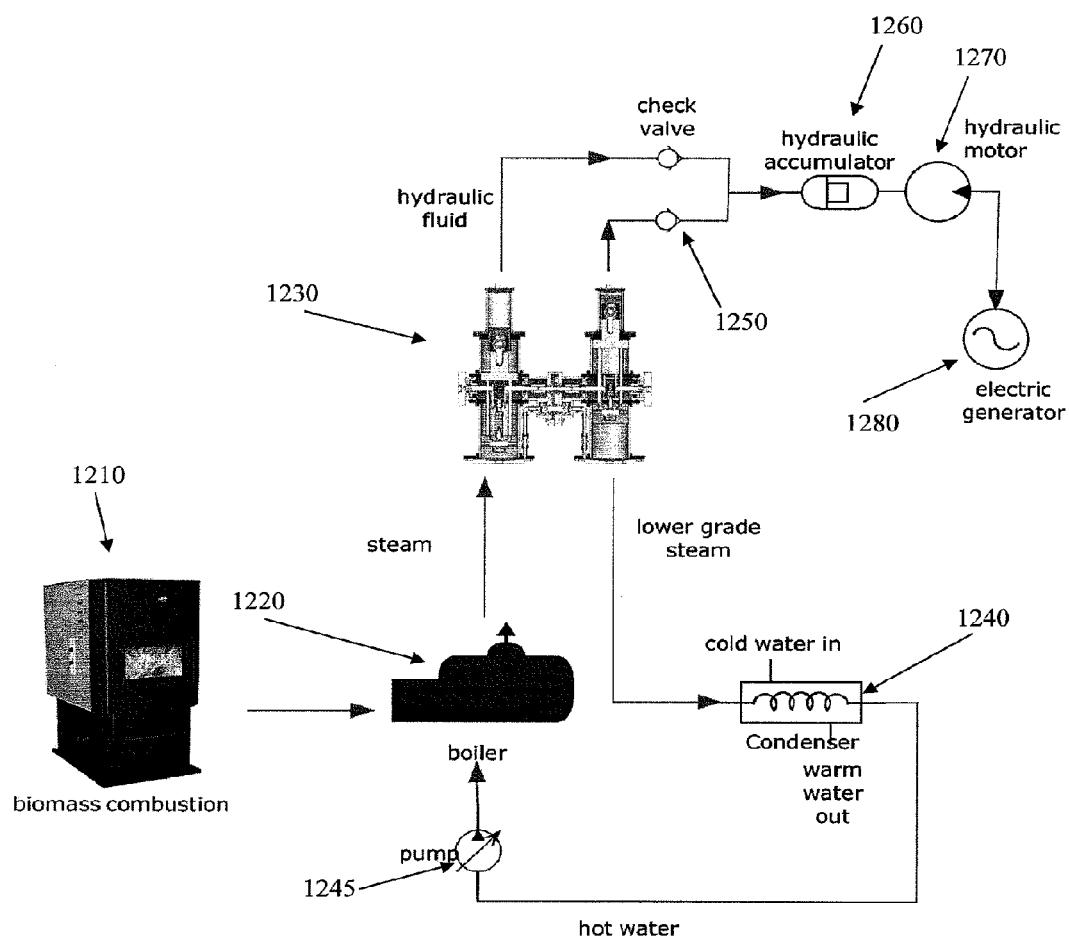
FIG. 12 illustrates a system for extracting electricity from biomass combustion using a pressurized gas powered compressor, in accordance with an embodiment of the present invention.

FIG. 12 illustrates a system for extracting electricity from biomass combustion using a pressurized gas powered compressor, in accordance with an embodiment of the present invention. The system may operate substantially similarly to the system described with respect to FIG. 11, except that, instead of a solar concentrator, the system comprises a biomass combustion apparatus (1210) configured to generate heat energy from combustion of biomass fuel, such as wood products, plant products, animal products, or a combination thereof, or the like, the heat energy conveyed to a vapour generator. Additionally, in some embodiments, the working fluid may be water and/or steam instead of a LBP working fluid. The system may comprise a boiler (1220) for boiling steam using heat from the biomass combustion apparatus (1210), a compressor (1230) operated by steam from the boiler (1220), a condenser (1240) for condensing exhaust steam from the compressor (1230) and a pump (1245) for recirculation of condensed exhaust. The system may further comprise one or more check valves (1250) operatively coupled to an output circuit of the compressor (1230), along with a hydraulic accumulator (1260), hydraulic motor (1270), and electric generator (1280) of a work extraction system, configured for generation of electricity using hydraulic fluid from the compressor (1230).

Figure 13:
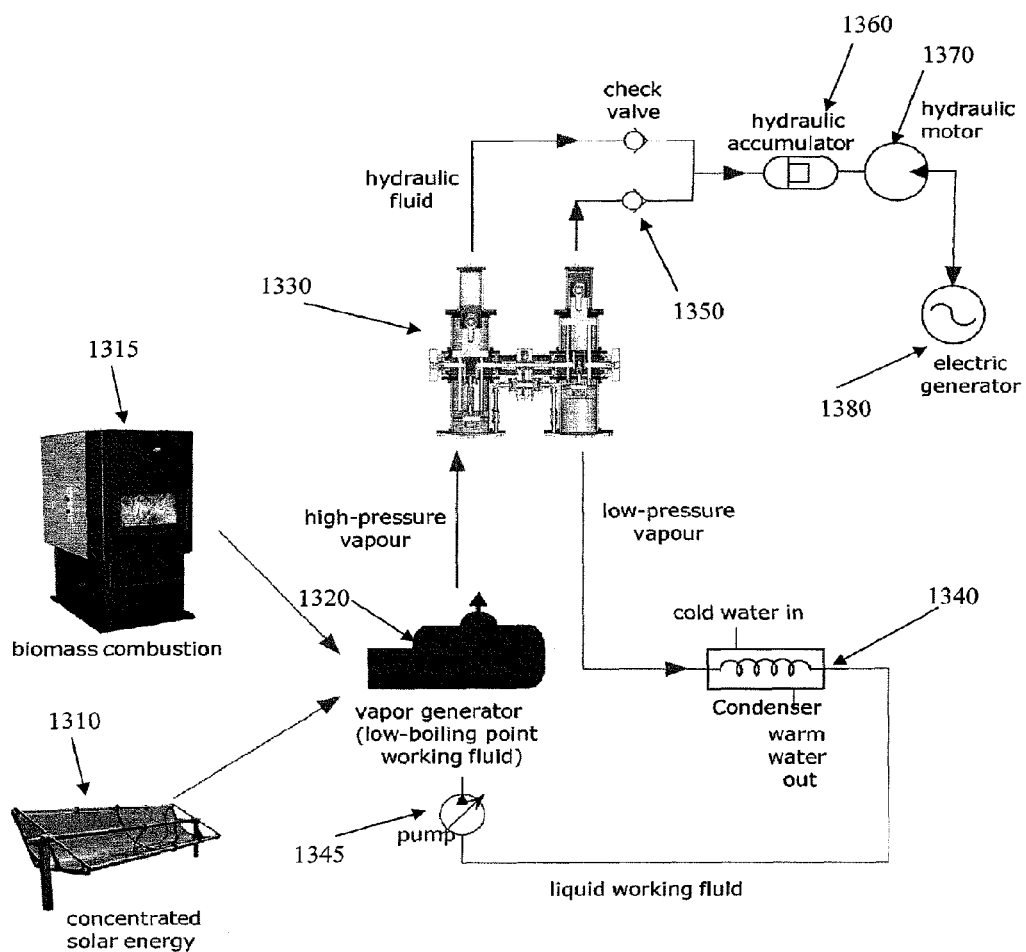
FIG. 13 illustrates a system for extracting electricity from solar energy, biomass combustion, or a combination thereof, using a pressurized gas powered compressor, in accordance with an embodiment of the present invention.

FIG. 13 illustrates a system for extracting electricity from solar energy, biomass combustion, or a combination thereof, using a pressurized gas powered compressor, in accordance with an embodiment of the present invention. The system may operate substantially similarly to the systems described with respect to FIGS. 11 and 12, except that one or more of a plurality of heat sources may be selectably used. Heat energy may be generated substantially concurrently or at different times by a solar concentrator (1310) and a biomass combustion apparatus (1315). Use of a plural heat sources may increase reliability, economic viability, or the like, of the system. The system may comprise a vapour generator (1320) for generating high-pressure vapour using heat from the biomass combustion apparatus (1315) and/or solar concentrator (1310), a compressor (1330) operated by vapour from the vapour generator (1320), a condenser (1340) for condensing exhaust from the compressor (1330) and a pump (1345) for recirculation of condensed exhaust. The system may further comprise one or more check valves (1350) operatively coupled to an output circuit of the compressor (1330), along with a hydraulic accumulator (1360), hydraulic motor (1370), and electric generator (1380) of a work extraction system, configured for generation of electricity using hydraulic fluid from the compressor (1330).

Figure 14:
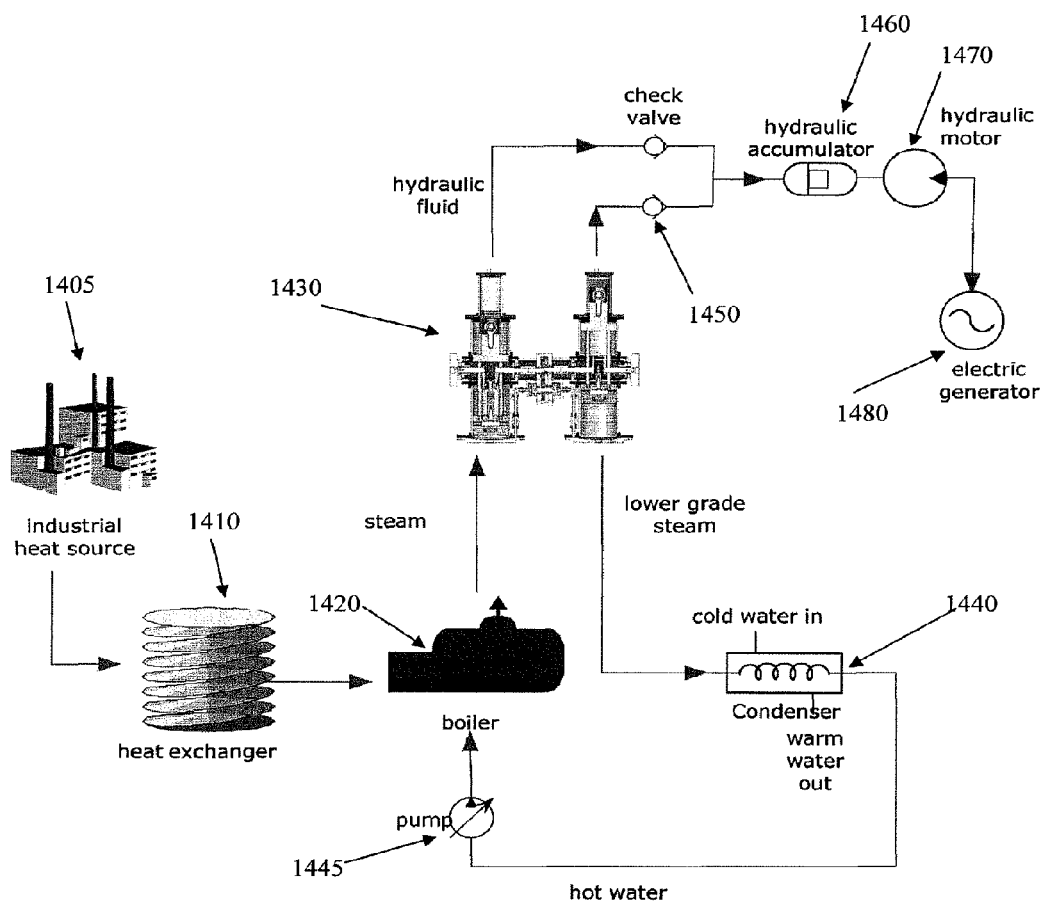
FIG. 14 illustrates a system for extracting electricity from an industrial heat source using a pressurized gas powered compressor, in accordance with an embodiment of the present invention.

FIG. 14 illustrates a system for extracting electricity from an industrial heat source (1405) using a pressurized gas powered compressor, in accordance with an embodiment of the present invention. The system may operate substantially similarly to the systems described with respect to FIG. 11 or 12, except that heat energy provided to the boiler is generated from an industrial process, and may be passed through a heat exchanger (1410). For example, industrial processes may include smelting processes, chemical processes involving exothermic reactions, processes using heated solids, liquids, or gases which are subsequently cooled, for example via the heat exchanger (1410), or the like. In some embodiments, the system is configured to utilize waste industrial heat for electricity generation. The system may comprise a boiler (1420) for boiling steam using heat from the biomass combustion apparatus (1410), a compressor (1430) operated by steam from the boiler (1420), a condenser (1440) for condensing exhaust steam from the compressor (1430) and a pump (1445) for recirculation of condensed exhaust. The system may further comprise one or more check valves (1450) operatively coupled to an output circuit of the compressor (1430), along with a hydraulic accumulator (1460), hydraulic motor (1470), and electric generator (1480) of a work extraction system, configured for generation of electricity using hydraulic fluid from the compressor (1430).

Figure 15:
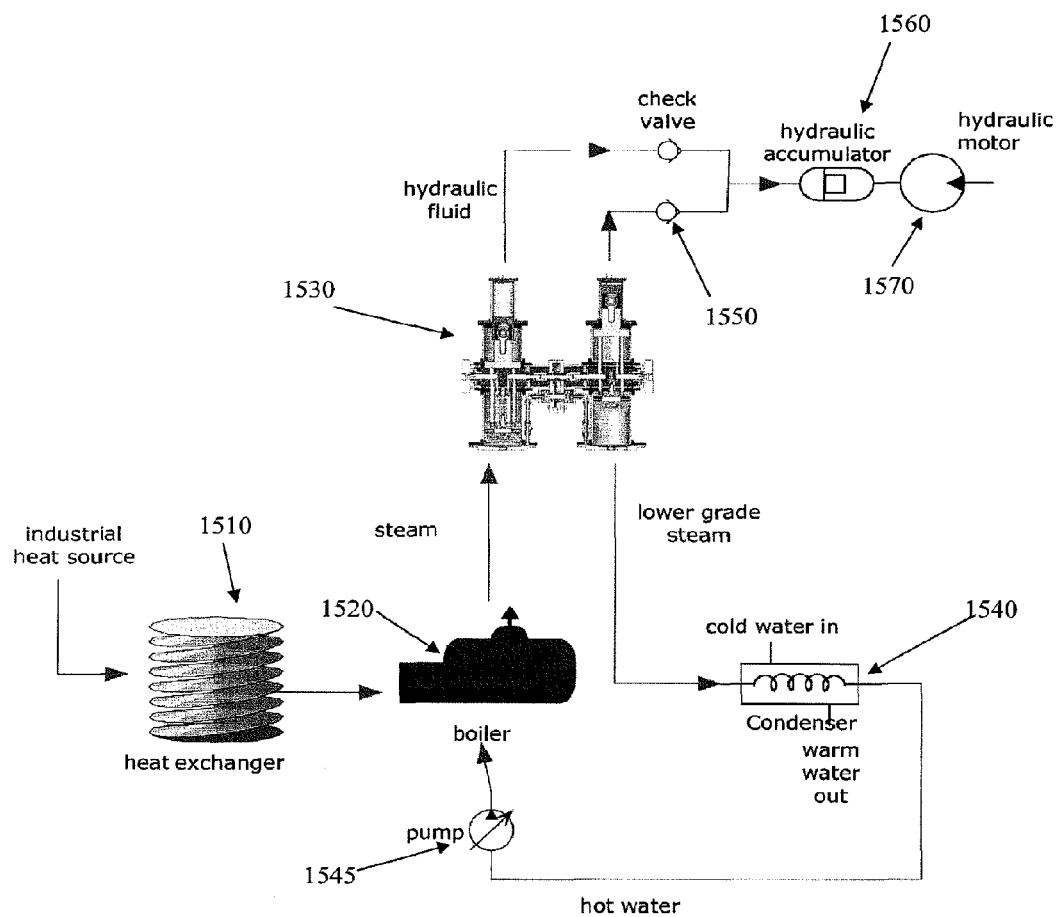
FIG. 15 illustrates a system for extracting motive force from an industrial heat source using a pressurized gas powered compressor, in accordance with an embodiment of the present invention.

Alternatively, in accordance with an embodiment of the present invention as illustrated in FIG. 15, the system may be configured for extracting motive force from an industrial heat source using a pressurized gas powered compressor. For example, a hydraulic motor (1570) may be configured to provide mechanical motive force for use in one or more appropriate applications, such as for operating tools or machinery, as would be readily understood by a worker skilled in the art, instead of or in addition to generation of electricity. The system may comprise a boiler (1520) for boiling steam using heat from the heat exchanger (1510), a compressor (1530) operated by steam from the boiler (1520), a condenser (1540) for condensing exhaust steam from the compressor (1530) and a pump (1545) for recirculation of condensed exhaust. The system may further comprise one or more check valves (1550) operatively coupled to an output circuit of the compressor (1530), along with a hydraulic accumulator (1560), and the hydraulic motor (1570), of a work extraction system configured for generation motive force.

Figure 16:
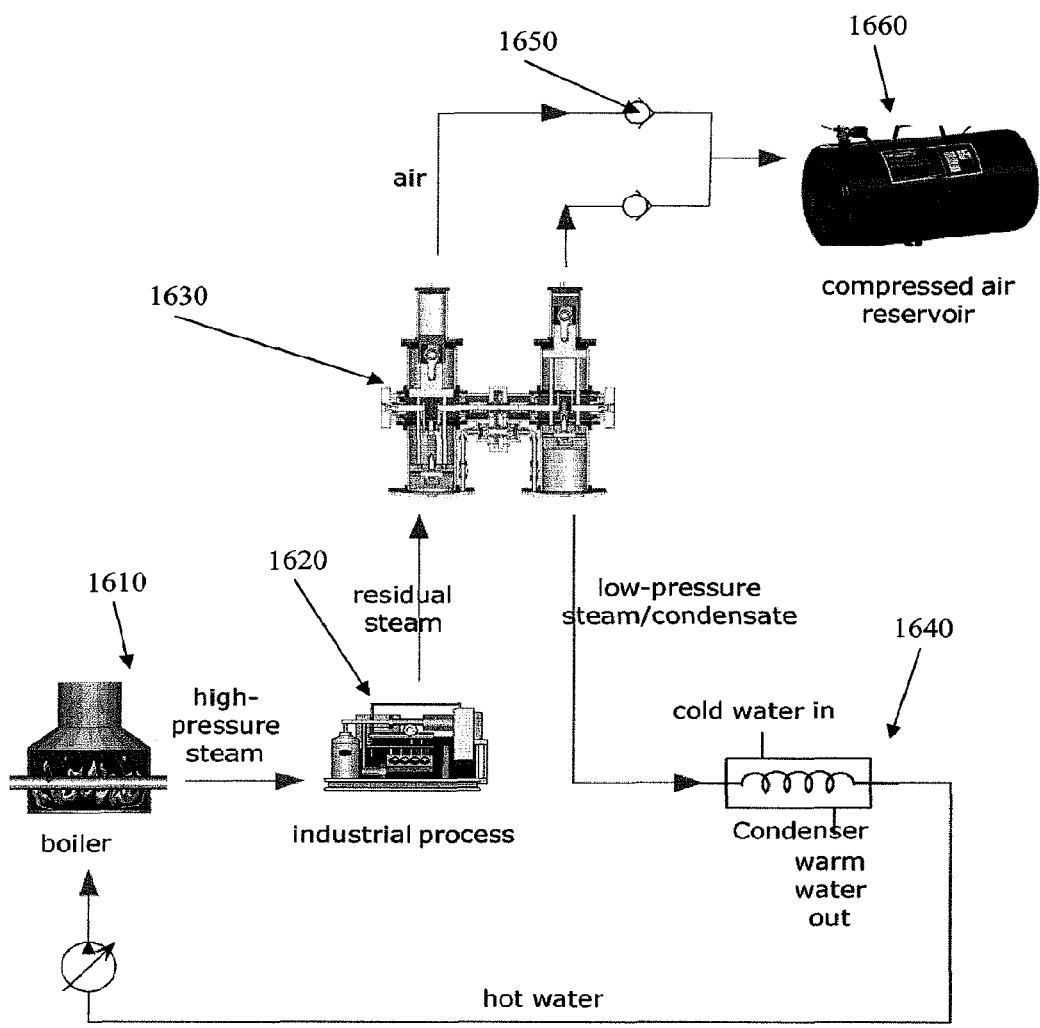
FIG. 16 illustrates a system for producing compressed air from residual steam using a pressurized gas powered compressor, in accordance with an embodiment of the present invention.

FIG. 16 illustrates a system for producing compressed air from residual steam using a pressurized gas powered compressor, in accordance with an embodiment of the present invention. A boiler (1610), fuelled for example by industrial heat, solar energy, biomass combustion, fossil fuel combustion, or the like, high-pressure steam, which may be superheated steam, from the boiler is partially used in an industrial process (1620). The residual steam from the industrial process, which may be wet or saturated steam, is provided as input to an input circuit of the pressurized gas powered compressor (1630) and performs work thereon. The spent working fluid is exhausted from the pressurized gas powered compressor (1630) to an exhaust system and condensed in condenser (1640), before being recirculated back to the boiler (1610) for reboiling. The gas powered compressor (1630) conveys power from its input circuit to an output circuit thereof, which is configured to compressively perform work on a compressible fluid, such as air, by pumping it. The air is pumped through one-way check valves (1650) to a compressed air reservoir (1660), where it may be stored and subsequently used for applications such as for operating pneumatic tools or machinery, or for transferring to portable containers, or the like.

Figure 17:
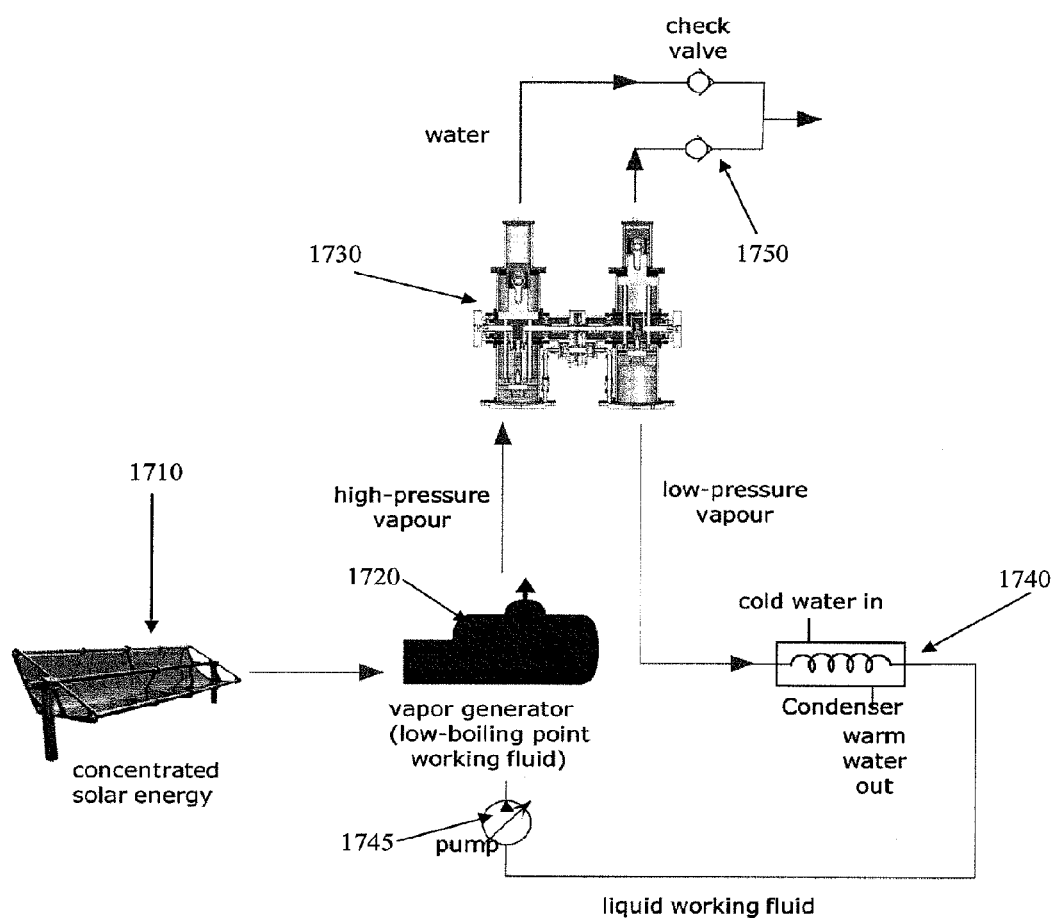
FIG. 17 illustrates a system for pumping water using solar energy using a pressurized gas powered compressor, in accordance with an embodiment of the present invention.

FIG. 17 illustrates a system for pumping water using solar energy using a pressurized gas powered compressor, in accordance with an embodiment of the present invention. The system may operate substantially similarly to the system described with respect to FIG. 11, except that the hydraulic fluid pumped by the output circuit is water, and a hydraulic accumulator, hydraulic motor, and electric generator may not be required. The system may be used, for example, to pump drinking water from a well or aquifer, to pump water to a reservoir, over an obstacle, or the like. The system may comprise a solar concentrator (1710) configured to convey heat energy from the sun to a vapour generator (1720), a compressor (1730) operated by vapour from the vapour generator (1720), a condenser (1740) for condensing exhaust from the compressor (1730) and a pump (1745) for recirculation of condensed exhaust. The system may further comprise one or more check valves (1750) operatively coupled to an output circuit of the compressor (1730).

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A system for extracting work from heat using a pressurized gas powered compressor, the system comprising:
   a) a device to transfer heat to a working fluid, converting it to a gaseous state;
   b) a compressor powered by said working fluid in a gaseous state, the compressor comprising:
      i. an input circuit configured to channel the pressurized gas through two or more input piston-cylinder assemblies, wherein each input piston-cylinder assembly is configured to expel spent gas after use, wherein:
         at least one of the input piston-cylinder assemblies comprises a piston fitted with one or more double rings, each double ring comprising an O-ring set into a groove and a machined ring made of a low-friction material, the O-ring configured to apply outward pressure to the machined ring, thereby providing a hermetic seal between each piston and an associated cylinder wall;
      ii. an output circuit including two or more output piston-cylinder assemblies of a smaller diameter than the input piston-cylinder assembly, each output piston-cylinder assembly including an intake valve for entry of fluid and an output valve for exit of compressed fluid;
      iii. a transfer system configured to transfer force generated in the input piston-cylinder assemblies onto the output piston-cylinder assemblies;
      iv. a return system configured to facilitate a return stroke of at least a first one of the input piston-cylinder assemblies following a power stroke thereof;
      v. a timing system configured to control input and exhaust of the pressurized gas to and from the input piston-cylinder assemblies; and
   c) a pressurized gas input system configured to provide the pressurized gas for powering the compressor;
   d) a distribution system operatively coupled to the timing system, to the pressurized input system, and to the input circuit, the distribution system configured to cooperatively provide pressurized gas to the input piston-cylinder assemblies;
   e) an exhaust system configured to convey spent gas from the compressor; and
   f) a work extraction system configured to extract work from the compressor at least in part via said output fluid, wherein said work extraction system is configured to perform one or more operations selected from the group consisting of: generating compressed air, providing motive force, and generating electricity.

2. The system according to claim 1, wherein the work extraction system is configured to produce pressure upon a liquid in a hydraulic circuit comprising a combination of one or more valves, accumulators and motors, thereby producing motive force.

3. The system according to claim 2, wherein the system is configured to produce pressure upon a liquid in a hydraulic circuit comprising a combination of one or more valves, accumulators and motors, thereby driving a generator to produce electricity.

4. The system according to claim 1, wherein the device to transfer heat to a working fluid is powered by heat generated by one or more devices selected from the group comprising: industrial processes, heat produced by internal combustion engines, devices that concentrate heat from solar radiation, geothermal heat, and devices that produce heat from the combustion of renewable or non-renewable fuels including biomass and biogas.

5. The system according to claim 1, wherein the return system is actuated by the compressed fluid.

6. A method to transform heat into power, comprising the steps of:
   a) providing heat in order to heat a working fluid, thereby raising the temperature of said working fluid, changing said working fluid from liquid to gas, and thereby increasing its pressure,
   b) using said working fluid in gaseous phase resulting from step a) to create pressure upon a first piston moving slidably in a first cylinder, sealed by means of double rinds, comprising an O-ring set into a groove, surrounded by a machined ring made of a low-friction material,
   c) using the force of said first piston to exert force on a second piston of smaller diameter, moving slidably in a second cylinder, filled with a second fluid, causing the displacement and pressurization of said second fluid, at a pressure substantially greater than that of the first fluid, and
   d) extracting power from the pressurized flow of said second fluid and using residual heat remaining in the first fluid for heating, cooling, adsorption chilling or absorption chilling.

7. The method according to claim 6, wherein the heat derives from a source consisting of one of the heat sources comprising heat produced by industrial processes, heat produced by internal combustion engines, geothermal heat, heat produced by devices that concentrate heat from solar radiation, and heat produced from the combustion of renewable or non-renewable fuels, including biomass and biogas.

8. The method according to claim 6, wherein the second fluid in step c) is substantially incompressible.

9. The method according to claim 8, wherein the second fluid in step c) consists of a liquid in a hydraulic circuit comprising a combination of one or more valves, accumulators and motors.

10. The method according to claim 6, wherein a power extraction device is provided to carry out step d), wherein said power extraction device comprises at least one of motors, turbines and pumps, and is configured to perform one or more operations selected from the group consisting of: compressing air or other gases, providing motive force, and generating electricity.

11. The method according to claim 7, wherein steps b) and c) comprise:
   a. an input circuit configured to channel the said working fluid through two or more input piston-cylinder assemblies, wherein each input piston-cylinder assembly is configured to expel spent gas after use;
   b. an output circuit including two or more output piston-cylinder assemblies, each output piston-cylinder assembly including an intake valve for entry of said second fluid and an output valve for exit of said second fluid;
   c. a transfer system configured to transfer force generated in the input piston-cylinder assemblies onto the output piston-cylinder assemblies;
   d. a return system configured to facilitate a return stroke of at least a first one of the input piston-cylinder assemblies following a power stroke thereof;
   e. a timing system configured to control input and exhaust of said working fluid to and from the input piston-cylinder assemblies; and
   f. a distribution system operatively coupled to the timing system, to the pressurized input system, and to the input circuit, the distribution system configured to cooperatively provide said working fluid to the input piston-cylinder assemblies.

12. The method according to claim 11, wherein the return system is actuated by said second fluid.

13. The system according to claim 1, wherein the distribution system is configured to cut off of supply of pressurized gas to an input piston-cylinder assembly before an input piston thereof has completed its stroke, thereby allowing pressurized gas already present within said cylinder to dilate by further displacing the input piston.

14. The system according to claim 1, wherein the distribution system comprises:
   a. a valve body housing comprising:
      i. an input port connected to the pressurized gas input system;
      ii. an output port connected to the exhaust system; and
      iii. a cylinder port connected to one or more piston-cylinder assemblies; and
   b. a rotating valve body, rotatably fitted in the valve body housing, the rotating valve body including a partial disk fitted with a seal made of a low-friction material and a valve cover with a partial cut-out on its face;
   wherein: in a first rotational position of the rotating valve body, a channel is formed between the input port and the cylinder port, and the output port is blocked; and in a second rotational position of the rotating valve body, a channel is formed between the output port and the cylinder port, and the input port is blocked.

15. The system according to claim 1, wherein the input circuit comprises a first pair of two or more input piston-cylinder assemblies and a second pair of two or more input piston-cylinder assemblies, and wherein the timing system is configured to operate the first pair of two or more input piston-cylinder assemblies out of phase with the second pair of two or more input piston-cylinder assemblies.

16. The system according to claim 1, wherein at least one of the output piston-cylinder assemblies comprises an output piston attached to the transfer system by a rod-end bearing with sufficient degrees of freedom to facilitate damage prevention in the event of misalignment.

17. The system according to claim 1, wherein the low-friction material is a vitrified PTFE.

18. The system according to claim 1, wherein the input and output piston-cylinder assemblies are double-acting.

\* \* \* \* \*